US007873829B2

(12) United States Patent
Brabson et al.

(10) Patent No.: US 7,873,829 B2
(45) Date of Patent: *Jan. 18, 2011

(54) OFFLOAD PROCESSING FOR SECURE DATA TRANSFER

(75) Inventors: Roy Frank Brabson, Raleigh, NC (US); Mark Richard Gambino, Poughkeepsie, NY (US); Linwood Hugh Overby, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 39 days.

This patent is subject to a terminal disclaimer.

(21) Appl. No.: 12/121,849

(22) Filed: May 16, 2008

(65) Prior Publication Data
US 2008/0215877 A1 Sep. 4, 2008

Related U.S. Application Data

(63) Continuation of application No. 10/289,107, filed on Nov. 6, 2002, now Pat. No. 7,441,119.

(51) Int. Cl.
*H04L 29/06* (2006.01)
(52) U.S. Cl. .................. 713/164; 713/150; 713/151; 713/152
(58) Field of Classification Search ......... 713/150–152, 713/164
See application file for complete search history.

(56) References Cited

U.S. PATENT DOCUMENTS 6,397,331 B1 * 5/2002 Ober et al. .................. 713/164

| | | | | |
|---|---|---|---|---|
| 6,704,871 | B1 * | 3/2004 | Kaplan et al. | 713/192 |
| 6,807,636 | B2 * | 10/2004 | Hartman et al. | 726/14 |
| 7,149,892 | B2 * | 12/2006 | Freed et al. | 713/151 |
| 7,181,766 | B2 * | 2/2007 | Bendinelli et al. | 726/15 |
| 7,302,564 | B2 * | 11/2007 | Berlin | 713/151 |
| 7,353,380 | B2 * | 4/2008 | VanHeyningen | 713/150 |
| 7,441,119 | B2 * | 10/2008 | Brabson et al. | 713/164 |
| 2003/0046585 | A1 * | 3/2003 | Minnick | 713/201 |
| 2005/0257045 | A1 * | 11/2005 | Bushman et al. | 713/156 |
| 2008/0216150 | A1 * | 9/2008 | Brabson et al. | 726/1 |

* cited by examiner

*Primary Examiner*—Syed A. Zia
*Assistant Examiner*—Viral S Lakhia
(74) *Attorney, Agent, or Firm*—Steven L. Nichols; Van Cott, Bagley, Cornwall & McCarthy P.C.

(57) ABSTRACT

Improvements in security processing are disclosed which enable security processing to be transparent to the application. Security processing (such as Secure Sockets Layer, or "SSL", or Transport Layer Security, or "TLS") is performed in (or controlled by) the stack. A decision to enable security processing on a connection can be based on configuration data or security policy, and can also be controlled using explicit enablement directives. Directives may also be provided for allowing applications to communicate with the security processing in the stack for other purposes. Functions within the protocol stack that need access to clear text can now be supported without loss of security processing capability. No modifications to application code, or in some cases only minor modifications (such as inclusion of code to invoke directives), are required to provide this security processing. Improved offloading of security processing is also disclosed, which provides processing efficiencies over prior art offloading techniques. Offload components can be controlled from the kernel, an SSL layer or an application.

2 Claims, 24 Drawing Sheets

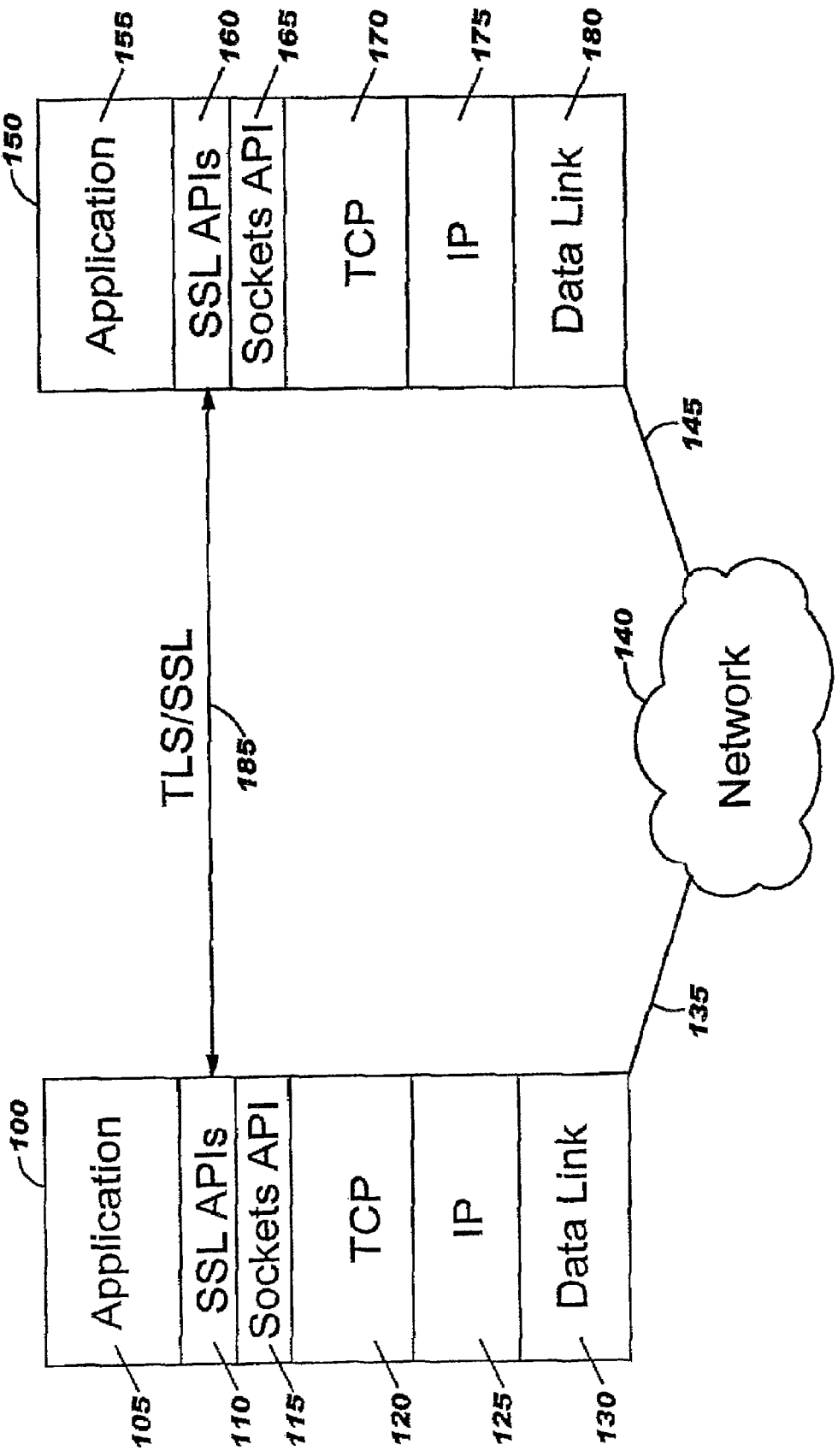

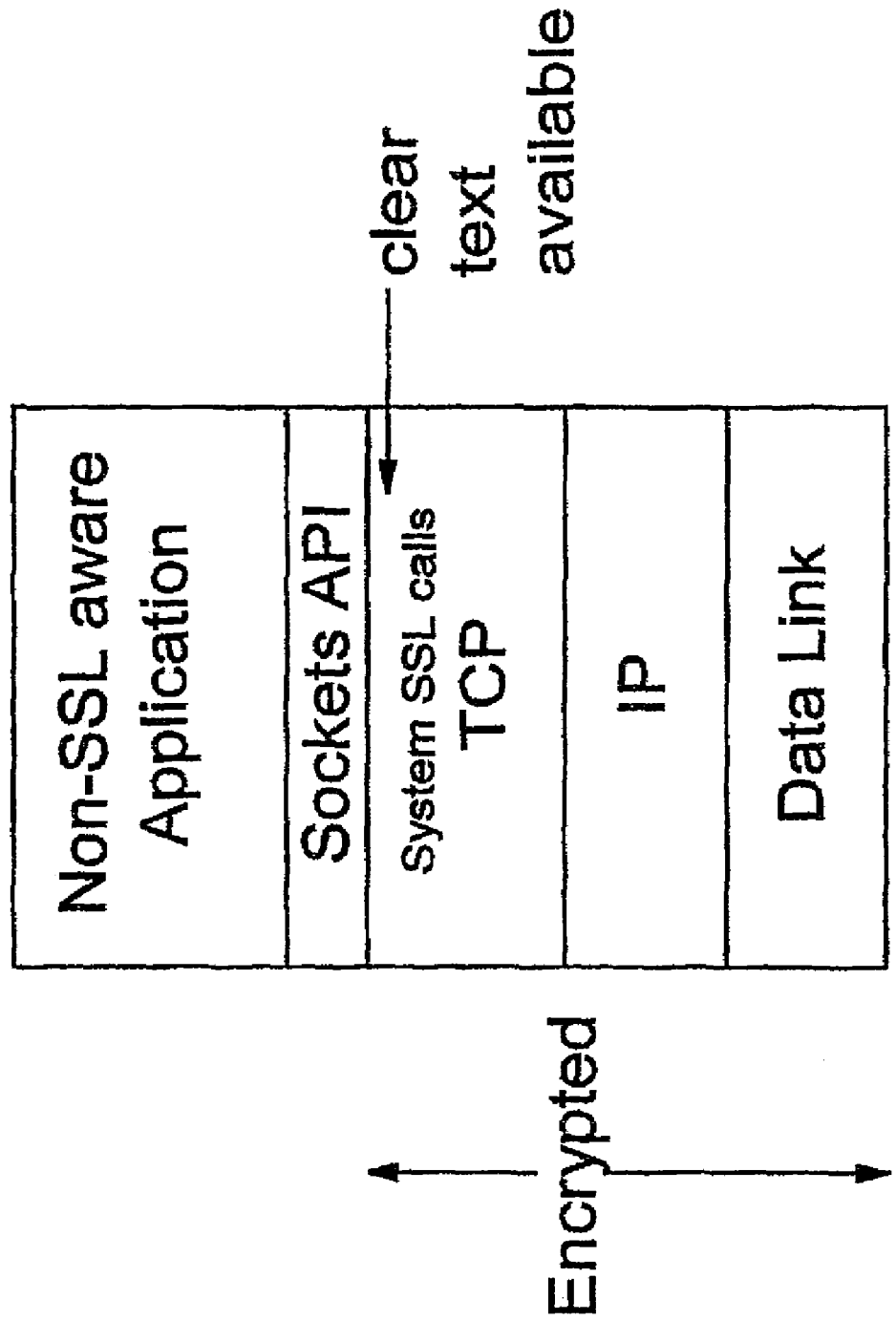

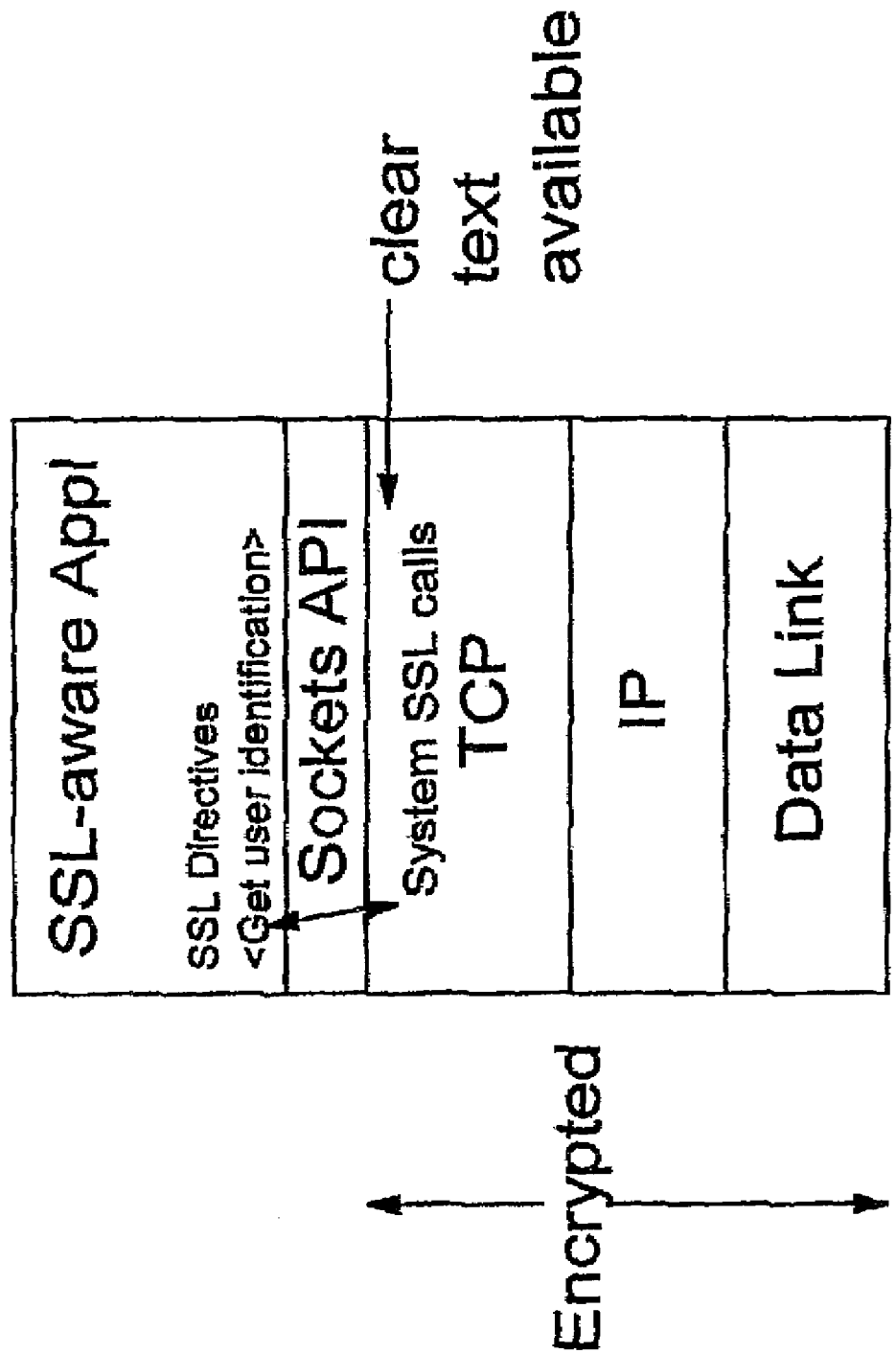

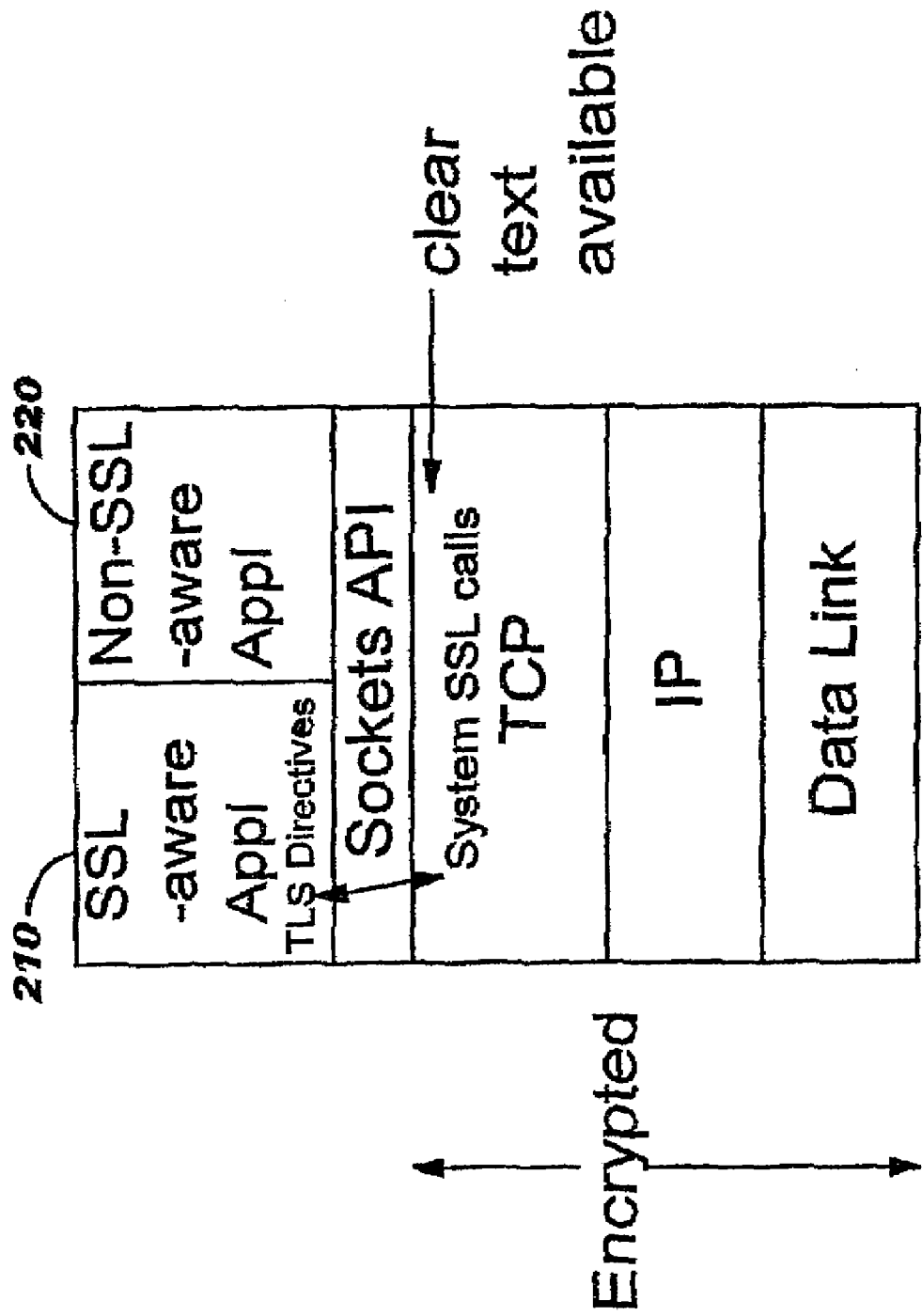

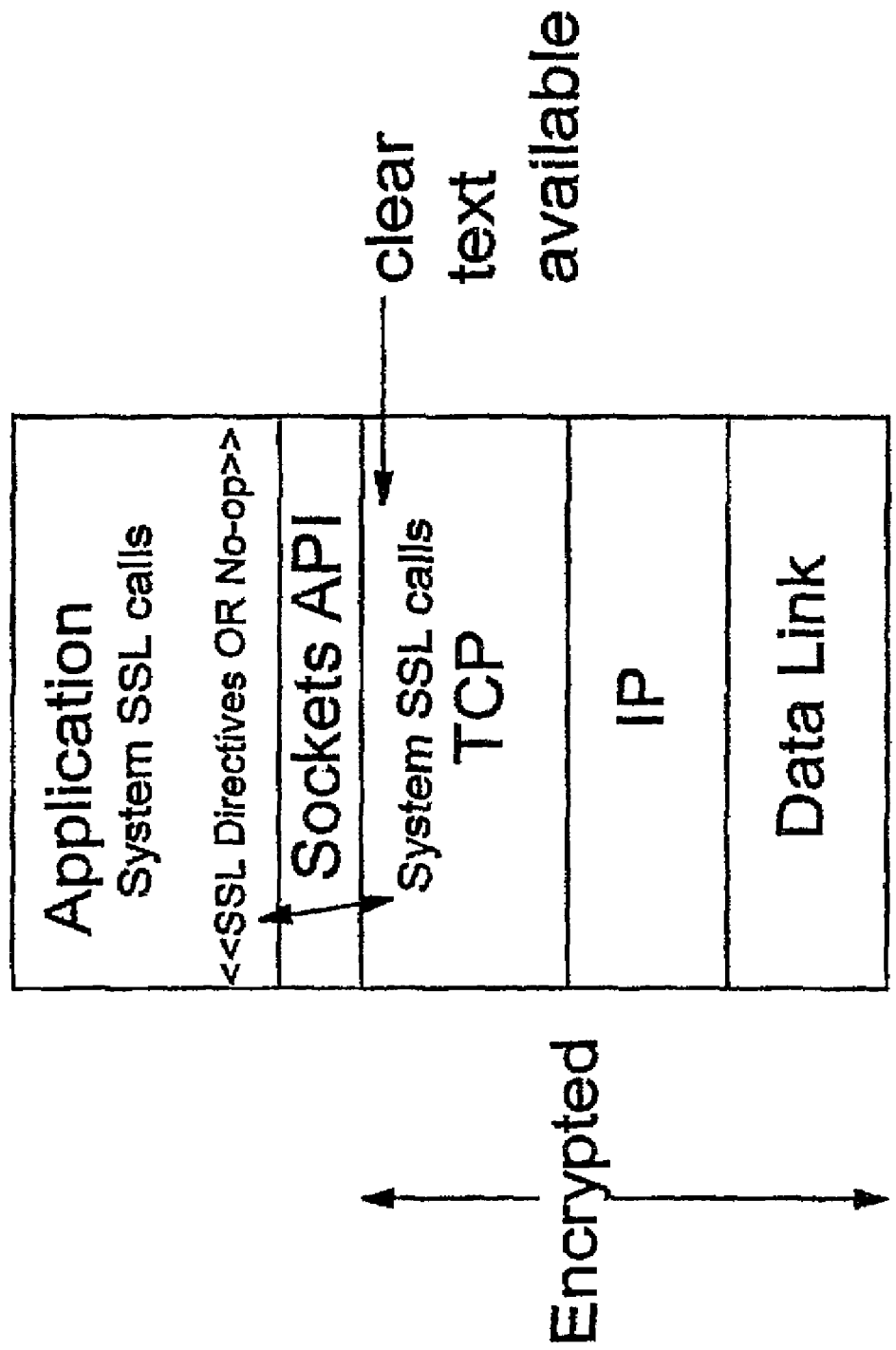

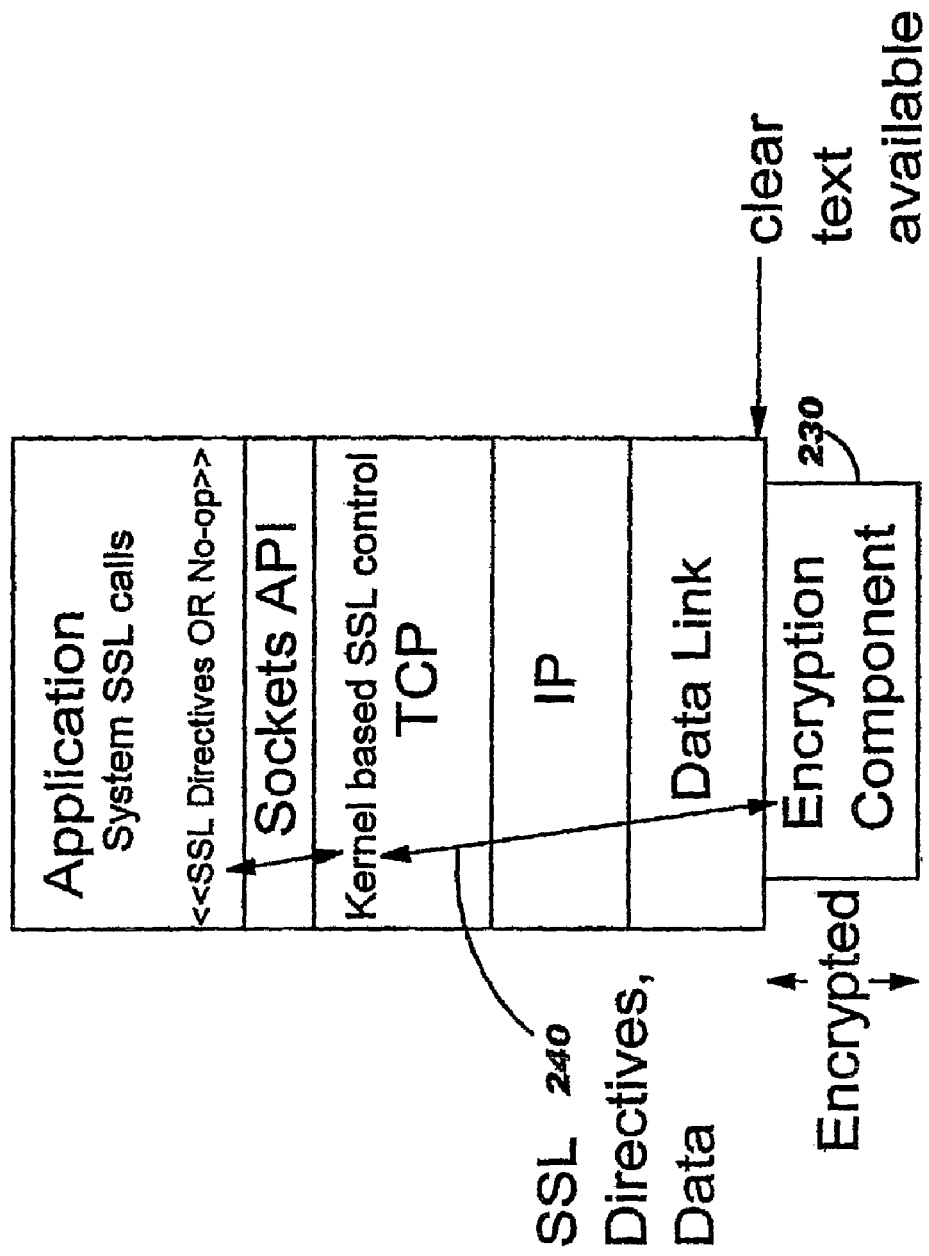

OFFLOAD PROCESSING FOR SECURE DATA TRANSFER

PRIORITY CLAIM

The present application is a continuation of U.S. patent application Ser. No. 10/289,107, now U.S. Pat. No. 7,441,119, filed on Nov. 6, 2002 and issued Oct. 21, 2008, and entitled, "Offload Processing for Secure Data Transfer," which is incorporated herein by reference.

CROSS-REFERENCE TO RELATED APPLICATIONS

The present application is related to copending U. S. patent application Ser. No. 12/121 844, filed concurrently, and also is related to U.S. patent application Ser. Nos. 10/007,582; 10/007,593; 10/007,446; and 10/007,581, all of which are incorporated herein by reference.

BACKGROUND OF THE INVENTION

1. Technical Field

The present invention relates to a computer system, and deals more particularly with improving security in a networking environment (such as the Internet) by performing secure protocol functions (such as processing for the Secure Sockets Layer, or "SSL", or an analogous security protocol such as Transaction Layer Security, or "TLS") in the kernel.

2. Description of the Related Art

Secure Sockets Layer, or "SSL", is a networking protocol developed by Netscape Communications Corp. and RSA Data Security, Inc. to enable secure network communications in a non-secure environment. More particularly, SSL is designed to be used in the Internet environment, where it operates as a protocol layer above the Transmission Control Protocol/Internet Protocol ("TCP/IP") layers. The application code then resides above SSL in the networking protocol stack. FIG. 1 illustrates a representative environment and interactions between two communicating entities 100, 150 using network 140. After an application 105 (such as a browser) creates data to be sent to a partner application 155 (such as a Web server), the data is passed to the SSL layer 110 on the sending side using calls to an SSL Application Programming Interface ("API") where various security procedures may be performed on the data. For example, the SSL layer may perform encryption, create a message digest or authentication code, and so forth. The SSL layer then passes the transformed data downwards in the protocol stack to the TCP layer 120 (typically passing through a Sockets layer 115 by making Sockets API calls). The data is then passed on to an IP layer 125 and data link layer 130, and is eventually transmitted by a physical layer (not shown) over a connection 135 to the network 140. On the receiver's side, data arrives over a connection 145 and is passed up the receiving stack through the physical layer (not shown), the data link layer 180, and the IP layer 175. After the TCP layer 170 on the receiving side receives the incoming data, it passes that data upward to the SSL layer 160 (typically when data is requested by Sockets API calls 165) where procedures (such as decryption) are performed to restore the data to its original form, and that restored data is then passed to the receiving application 155. Arrow 185 indicates the communication that occurs between the SSL layers 110 and 160 by virtue of traversing the stacks on the sending and receiving sides.

The current version of SSL is described in detail in "The SSL Protocol, Version 3.0", dated Nov. 18, 1996 and available on the World Wide Web (hereinafter, "Web") at http://home.netscape.com/eng/ss13/draft302.txt (hereinafter, "SSL specification"). An alternative to SSL is the Transaction Layer Security, or "TLS", protocol. TLS is designed as a follow-on security technique to eventually replace SSL. (SSL ends with Version 3.0, and TLS begins with a Version 1.0 that is based on the SSL Version 3.0 specification.) TLS is being standardized by a working group of the Internet Engineering Task Force ("IETF"), and is documented in "The TLS Protocol, Version 1.0", dated January, 1999. This document is also identified as IETF Request for Comments ("RFC") 2246. The message exchanges in the TLS protocol are analogous to those of the SSL protocol, and thus the interactions which have been described above apply in a similar manner to use of TLS in layers 110 and 160.

The protocols underlying the Internet (TCP/IP, for example) were not designed to provide secure data transmission. The Internet was originally designed with the academic and scientific communities in mind, and it was assumed that users of the network would be working in non-adversarial, cooperative manners. As the Internet began to expand into a public network, usage outside these communities was relatively limited, with most of the new users located in large corporations. These corporations had the computing facilities to protect their user's data with various security procedures, such as firewalls, that did not require security to be built into the Internet itself. In recent years, however, Internet usage has skyrocketed. Millions of people now use the Internet and the Web on a regular basis. (Hereinafter, the terms "Internet" and "Web" are used synonymously unless otherwise indicated.) These users perform a wide variety of tasks, from exchanging electronic mail messages to searching for information to performing business transactions. These users may be accessing the Internet from home, from their cellular phone, or from a number of other environments where firewalls and similar security procedures are not commonly available. To support the growth of the Internet as a viable place to do business, often referred to as "electronic commerce" or simply "e-commerce", easily-accessible and inexpensive security procedures had to be developed. SSL is one popular solution, and is commonly used with applications that send and receive data using the HyperText Transfer Protocol ("HTTP"). HTTP is the protocol most commonly used for accessing that portion of the Internet referred to as the Web. When HTTP is used with SSL to provide secure communications, the combination is referred to as "HTTPS". Non-commercial Internet traffic can also benefit from the security SSL provides. SSL has been proposed for use with data transfer protocols other than HTTP, such as Simple Mail Transfer Protocol ("SMTP") and Network News Transfer Protocol ("NNTP"). TLS may be used with these protocols as well. Hereinafter, it should be assumed that references to SSL include TLS and vice versa.

SSL is designed to provide several different but complementary types of security. First is message privacy. Privacy refers to protecting message content from being readable by persons other than the sender and the intended receiver(s). Privacy is provided by using cryptography to encrypt and decrypt messages. SSL uses asymmetric cryptography, also known as public-key cryptography. A message receiver can only decrypt an encrypted message if he has the proper private key and decryption algorithm. Second, SSL provides data integrity for messages being transmitted. Data integrity refers to the ability for a message recipient to detect whether the message content was altered after its creation (thus rendering the message untrustworthy). A message creator passes the message through an algorithm which creates what is called a "secure message digest", or "message authentication code"

or "MAC". A shared cryptographic key is an input to the algorithm. By using a cryptographic key, it is assured that only the holder of the key could have created the message digest. Alternatively, the algorithm output is often referred to as a "hash" of the message, because algorithms of this type are known as "hashing algorithms". This digest or hash is sent along with the message. When the message is received, the receiver also processes the message through an algorithm, also using the same shared cryptographic key as input, creating another digest. If the digest computed by the receiver does not match the digest sent with the message, then it can be assumed that the message contents were altered in some way after the message was created or that the message originated from a sender other than the expected sender. The third security feature SSL provides is known as authentication. Communications over the Internet take place as a sequence of electronic signals, without the communicating parties being able to see each other and visually determine with whom they are communicating. Authentication is a technique that helps to ensure that the parties are who they represent themselves to be—whether the party is a human user or an application program. For example, if a human user is buying goods over the Internet using a credit card, it is important for him to know that the application waiting on the other end of the connection for his credit card information is really the vendor he believes he is doing business with, and not an impostor waiting to steal his credit card information.

These security features are very powerful, and provide a high degree of protection for Internet users as well as other types of networking environments. However, existing implementations of the SSL protocol require that code be added to the application to explicitly invoke SSL functions, including handshaking or negotiation procedures and protected data transfer. The application must also include code to maintain the SSL state information, and must deal with the cryptographic operations (for example, by requesting the SSL layer to perform encryption of a data packet). The added code makes the resulting programs much more complex, with a corresponding increase in development and support costs. Furthermore, there may be some applications for which the source code is not available, and thus adding code to provide security processing for these applications is not possible.

In existing implementations, the TCP/IP stack has no awareness that SSL is being used: the packets operated upon by TCP/IP are already encrypted when using SSL, and the TCP/IP layer has no way of accessing the clear text information. There are a number of situations where this is problematic. As one example, kernel-based caching operations such as those provided according to the Adaptive Fast Path Architecture, which are also known as Fast Response Cache Accelerator or "FRCA", from the International Business Machines Corporation ("IBM") are designed to very efficiently serve cached content from storage that is accessible by the kernel. If the inbound clear text HTTP request is not available for interpretation at the kernel level, then the content cannot be served from the cache by kernel-level code, but rather must be handled by the HTTP server which runs as user-level code. (Refer to "Adaptive Fast Path Architecture", E. C. Hu et al., *IBM Journal of Research and Development*, issue 45-2 (2001), pp. 191-206, for more information on FRCA.)

Accordingly, what is needed is improved security processing when using a security protocol such as SSL or TLS.

SUMMARY OF THE INVENTION

An object of the present invention is to provide improved security processing when using a security protocol such as SSL or TLS.

Another object of the present invention is to provide improved security processing by moving SSL or TLS functions into the kernel.

An object of the present invention is to enable security processing to be transparent to application code.

A further object of the present invention is to provide improved security processing in a backward-compatible manner.

Still another object of the present invention is to enable applications to issue directives to influence security processing.

Yet another object of the present invention is to enable policy information to specify whether security processing is performed.

Still another object of the present invention is to enable configuration information to specify whether security processing is performed.

Another object of the present invention is to provide security offload processing in an improved manner.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for improving security processing. In a first preferred embodiment, this technique comprises: providing security processing in an operating system kernel; providing an application program which makes use of the operating system kernel during execution; executing the application program; and selectably securing at least one communication of the executing application program using the provided security processing in the operating system kernel.

In a second preferred embodiment, this technique further comprises providing security policy information, whereby the selectably securing process operates to selectably secure communications of the executing application program even though the application may have no code pertaining to security.

In a third preferred embodiment, this technique comprises: providing a security offload component which performs security processing; providing control functions in an operating system kernel for directing operation of the security offload component; providing an application program; executing the application program; and executing the provided control functions during execution of the application program, thereby selectably directing the security offload component to secure at least one communication of the executing application program.

In a fourth preferred embodiment, this technique comprises providing a security offload component which performs security session establishment and control processing and providing a control function in an operating system kernel for initiating operation of the security session establishment and control processing by the security offload component. The control function, when activated, causes security offload components in the client and server to perform the security session establishment and control processing. In one mode, the operating system kernel maintains control over operation of this security session establishment and control processing. In another mode, the operating system kernel does not participate in operation of the security session establishment and control processing. In both modes, the security offload component notifies the kernel when the session establishment and control operations are complete (and, preferably, whether the operations succeeded or failed). Variations of this fourth embodiment allow the use of a security offload component, but move the control component from the stack to the SSL layer or into an application itself.

The secure protocol may be SSL, TLS, or another secure protocol.

The present invention may also be used advantageously in methods of doing business, for example whereby service providers may offer their customers improved security processing as described herein and/or may offer security processing for applications for which security enablement may be cost-prohibitive or even impossible.

The present invention will now be described with reference to the following drawings, in which like reference numbers denote the same element throughout.

BRIEF DESCRIPTION OF THE DRAWINGS

FIG. 1 is a block diagram of a representative environment where a security protocol is used for secure communications, according to the prior art;

FIGS. 2A through 2H illustrate placement of security processing with reference to the protocol stack, according to various preferred embodiments of the present invention;

DESCRIPTION OF PREFERRED EMBODIMENTS

Figure 2D:
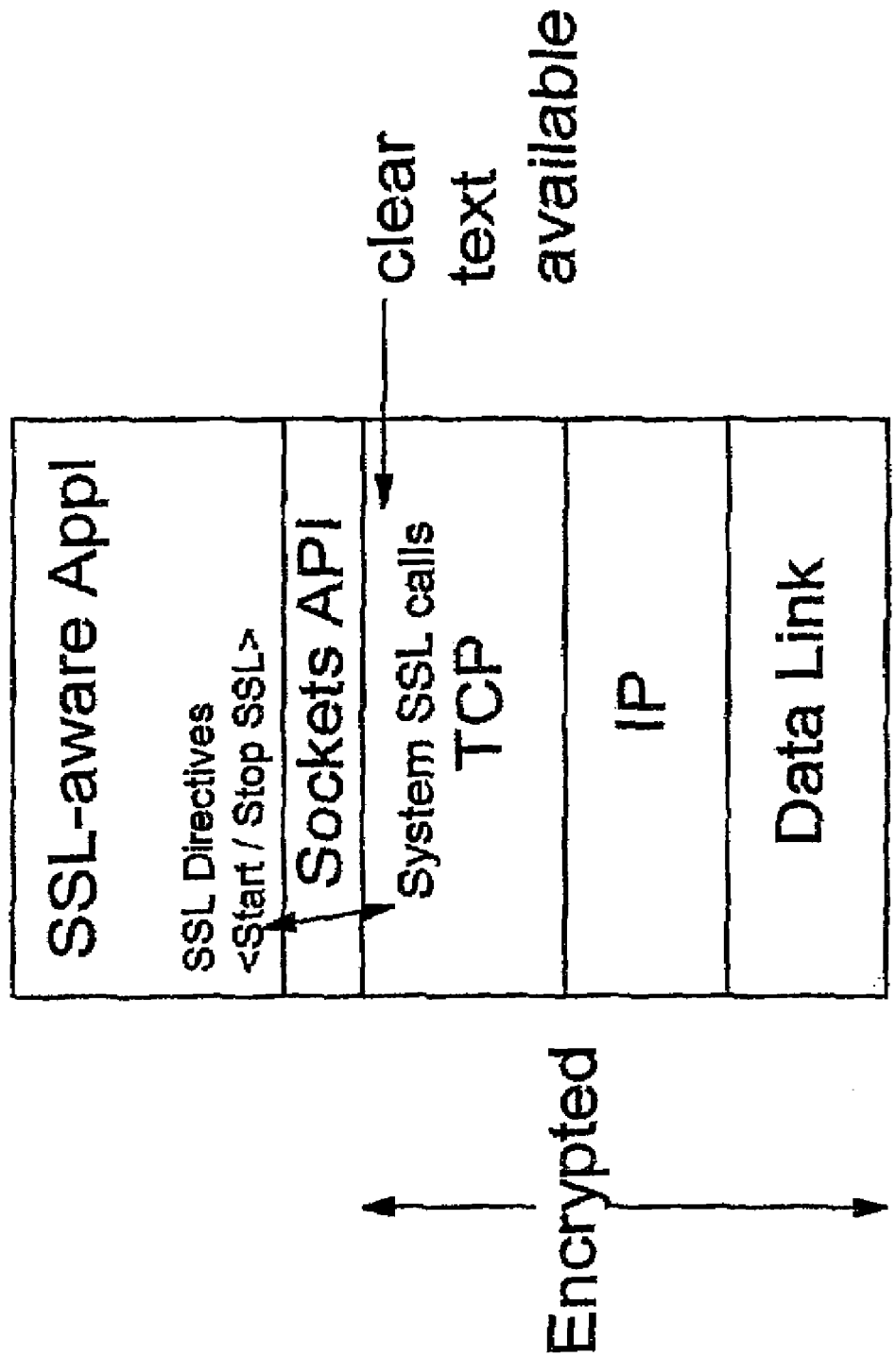

The present invention moves security processing (or control thereof) for security protocols such as SSL and TLS (which are connection-oriented protocols) into the kernel. In several embodiments, the security processing is performed in the TCP layer. In another embodiment, the security processing is offloaded to a component which is referred to herein as an "encryption component" or "security offload component"; in this embodiment, the TCP layer is responsible for communicating control information to the encryption component. (As will be obvious, the "encryption component" may also perform decryption.) The approach of the present invention has a number of advantages over existing implementations that perform security functions in the application. As discussed earlier, security processing may greatly increase the complexity of application programs, and therefore moving this processing out of the application allows the programmer to focus on the task at hand; at the same time, use of the present invention enables the application to transmit and/or receive data securely. As another example, moving security processing (or control thereof) into the kernel allows layers of the stack to access clear text. This may be beneficial in many situations, such as when using kernel-based caching, which was described above.

The approach used in the present invention addresses a number of different application scenarios. An implementation of the invention may support one or more of these application scenarios, which will now be described with reference to FIGS. 2A through 2H.

In a first scenario, applications are not SSL-enabled (that is, they do not contain code to invoke or perform SSL functions) and do not need SSL awareness in their processing. These applications function without requiring any additional coding for security functions when using preferred embodiments of the present invention based on configuration settings. The configuration settings, which are transparent to the applications, cause SSL processing to be automatically and transparently performed for these applications through use of the present invention. (Use of configuration settings is described in more detail below.) When the configuration settings indicate that data transmitted from the application should be secured using SSL, the security processing is localized to the TCP layer. FIG. 2A illustrates this first scenario, which may be considered as a "secure port model" whereby all connections to a particular port are either SSL-enabled or not. Preferably, this approach is used only for server applications and for applications which use a well-known port number, where this port number should be used for specifying the SSL-enablement option. (Clients that use ephemeral ports, which are unpredictable, do not lend themselves to this type of port-specific enablement approach.) Before discussing other scenarios, use of configuration settings will now be described.

When moving security processing or control thereof into the stack, according to the present invention, the application is no longer responsible for specifying which outbound data packets should be encrypted. This decision may be made by checking configuration data, which may be local to the application. The configuration data may be provided in a number of ways, such as through environment variables, using definitions on PORT statements in the TCP/IP configuration, using job control language ("JCL") parameters, and so forth. In preferred embodiments, this configuration data also provides input data for use by the SSL functions, such as authentication information, cipher suites option, and security key input information such as key(s) or the file name of the key ring(s) to be used. The application need not be aware that this configuration data exists. Instead, the stack will access the configuration data and enable SSL processing if indicated by that data.

Returning now to the discussion of application scenarios supported by the present invention, in a second scenario the application is not SSL-enabled but needs some SSL awareness. That is, the application may need to issue calls to the SSL functionality. For example, a server application may need to determine the identity of the client with which it is communicating. This may be useful when only authenticated clients, or perhaps selected clients who are determined by consulting a registry or similar list, can access particular application functions at the server. One way in which this information can be obtained is to retrieve the client's digital certificate (or user identifier based on such a certificate) which the client provided during session establishment, and which is processed by the stack (rather than the application) when using the present invention. (As is known in the art, digital certificates typically adhere to a format known as an "X.509 certificate". The details of how digital certificates are formatted and how they are used are known in the art, and will not be repeated herein.) Preferably, one or more API calls for requesting client information are supported by an implementation of the present invention. The application may then issue an API call such as "GET_CLIENT_CERT" or "GET_CLIENT_ID". The stack responds accordingly, providing the requested information. The API calls are referred to equivalently herein as "SSL directives". (It will be obvious to one of ordinary skill in the art, once the teachings disclosed herein are known, how such API support may be implemented. Furthermore, it will be obvious that the example API calls discussed herein are merely illustrative, and that additional and/or different calls may be supported without deviating from the scope of the present invention. In addition, an implementation of the present invention may omit support for such API calls if desired.) In this second scenario, illustrated in FIG. 2B, only a minimal amount of security processing (that is, invoking the API and receiving its response) needs to be added to the application. Preferably, this approach is used only for server applications and for those applications which use a well-known port number to configure whether security processing will be performed (in a similar manner to that which was described above for FIG. 2A).

In a third scenario, the application is not SSL-enabled, but SSL processing may be selectively enabled by consulting security policy information which specifies conditions under which SSL is to be enabled. (Security policy information may be used as an alternative to configuration settings, which were described above with reference to FIG. 2A.) Before continuing the discussion of the third scenario, use of security policy information according to preferred embodiments of the present invention will now be described.

Security policy information may be created by a person such as a security administrator, and may be stored in a policy database or other repository (referred to hereinafter as a database for ease of reference). This approach promotes uniform treatment of security throughout an enterprise, as the administrator can work with consistent policy formats for all applications. The specified security policy may range from simple to complex. An example of a simple policy is specifying that SSL is to be enabled for a particular port number or for a particular job name. As an example of more complex policy, the policy might specify that SSL should be used to protect communications with selected clients but not for other clients. Or, the policy might specify that SSL is to be enabled for particular source and/or destination IP addresses or address ranges, and/or for particular port numbers or ranges.

This security policy approach provides fine-grained control for both server and client applications. In contrast, prior art implementations typically negotiate SSL enablement per application. In addition to improved granularity, a significant benefit of the security policy approach of the present invention is that the enablement decision is made by the stack when a connection is established, removing the need for the application to negotiate SSL. When using this fine-grained security policy approach, SSL support may vary from one socket to another on the same port, with some sockets using SSL processing while others do not.

The security policy database may also provide input data for use by the SSL functions, such as authentication information, cipher suites option, and security key input information such as key(s) or the file name of the key ring(s) to be used when a particular policy applies.

Returning to the third scenario, this scenario is depicted in FIG. 2C, which illustrates that this novel policy-based technique may be used both with applications that are SSL-aware (see reference number 210) as well as with applications that are not SSL-aware (see reference number 220). SSL processing operates in the stack, as in the other scenarios which have been described. Applications that are SSL-aware may optionally invoke API calls of the type which were discussed above with reference to the second scenario (for example, to retrieve client certificate information) to communicate with the SSL implementation in the stack.

Note that this third scenario may be used advantageously even in the absence of a well-known port number, in those cases where the policy is specified in terms of information other than port number. Furthermore, this third scenario allows a shared port approach without requiring applications to perform negotiation (which is not possible in prior art solutions that implement security processing in the application).

A fourth scenario addressed by the present invention is when applications are not SSL-enabled but have SSL awareness, and part of this awareness involves starting and stopping security processing under application control. For example, an application may need to negotiate certain information before determining whether security processing is necessary. TN3270 applications may function in this manner, whereby a TN3270 negotiation process is performed first, and depending on its outcome, SSL may or may not be enabled for the subsequent application processing. Similarly, applications using File Transfer Protocol ("FTP") may perform FTP negotiations before determining whether to enable SSL. The application-directed security of this fourth scenario provides processing efficiencies by delaying the overhead of SSL processing (for example, the SSL handshake protocol flows and establishment of various data structures required for storing SSL state information) until it is known that the application will use secured communications. Preferably, SSL directives such as "Start_SSL" and "Stop_SSL" are supported by an implementation of the present invention for this purpose. Accordingly, under application control, a mix of secured and non-secured communications may occur on a single port or for a single socket, providing a great deal of flexibility. Because the security processing does not need to be tied to a well-known port, this scenario extends to client applications as well as server applications. Optionally, the decision whether to use security processing can be configured in the TCP layer as an alternative to (or in addition to) use of directives from the application. FIG. 2D illustrates this fourth scenario, noting use of the start and stop directives by the application. (Additional information may be conveyed with the directives for use by the SSL implementation, such as authentication information, cipher suites option, and security key input information.)

Applications that are already SSL-enabled, but which defer to the stack-based implementation of the present invention for performing security processing, comprise a fifth scenario. This scenario is illustrated by FIG. 2E, and provides backward compatibility. That is, the existing SSL calls in the application may now be treated as non-operational, because the SSL implementation in the stack is already performing the corresponding processing. This "no-op" approach should be taken for calls that request encryption or decryption of data. Alternatively, there may be instances where the existing calls may be used to trigger some type of processing, and thus not all such existing calls should be ignored. For example, a particular call might be re-interpreted as signaling to the SSL implementation in the TCP layer that this connection should now start using SSL, and calls such as those to retrieve a client's certificate should be interpreted to function as directives as disclosed herein. (Whether to provide a functional API for a specific call, and how that API operates, may vary according to enterprise-specific or application-specific needs.) This fifth scenario promotes application portability in that SSL-enabled applications may operate on hosts which support the present invention (in which case a number of the calls may operate as no-ops), and these same SSL-enabled applications may operate (without change) on hosts which do not support the present invention (in which case the calls invoke SSL processing in the application space).

In a sixth scenario, illustrated in FIG. 2F, SSL processing is offloaded from the stack yet remains under control of the stack. An encryption component such as a hardware accelerator (see reference number 230) may be physically integrated with or connected to the host in which the stack is located. In preferred embodiments, this scenario comprises reserving space for SSL protocol information (such as record number and message authentication code) in data packets which are processed by the IP layer, and passing control information (such as lengths and offset values to be used when encrypting data, digital certificates of the client and server, keys or file names of key rings to be used per connection, the encryption algorithm to be used, etc.) between the offloading stack and the encryption component. In addition, directives such as "Start_SSL" and "Stop_SSL" may be communicated from the offloading stack to the encryption component to direct it when to start or stop performing security functions on the data it receives. Arrow 240 generally represents the exchange of directives and data between the stack and the encryption component. Offloading of decryption may be performed in a similar manner. This offloading technique may be used with any of the application scenarios previously described (including those that issue SSL directives from an application and those that issue SSL calls which operate as no-ops), for applications that are SSL-enabled, SSL-aware, or neither SSL-enabled nor SSL-aware.

Figure 2G:
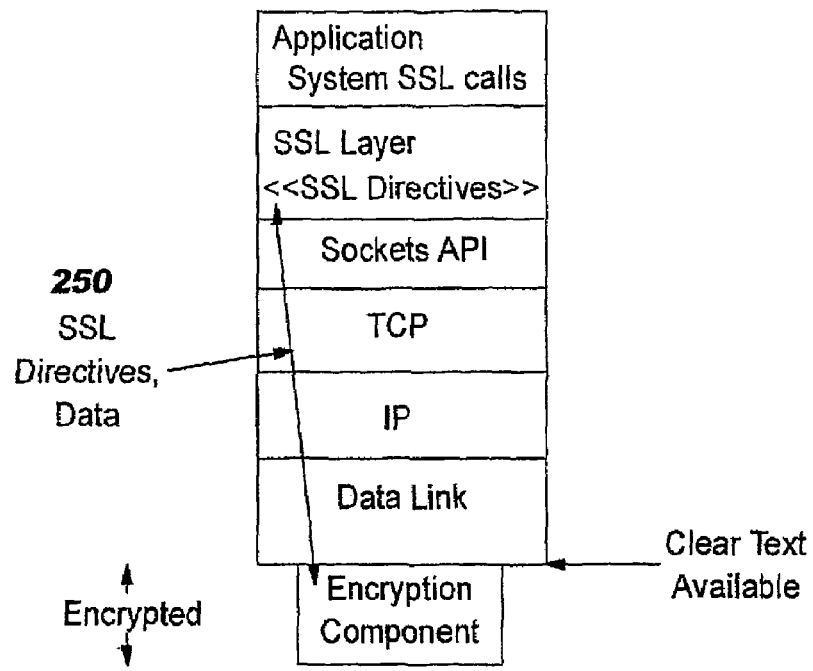

When an application is SSL-aware, the offloaded encryption component can also be directed from the SSL layer as illustrated in FIG. 2G. In this case, directives such as "Start_SSL" and "Stop_SSL" can be sent directly from the SSL layer to the offload component without being proxied by the stack as in FIG. 2F. Additionally, control information necessary for communication between the host and the offloaded encryption component for normal application data, can be processed by the SSL layer rather than in the stack. This type of implementation may be chosen for cases where the stack itself is not capable of doing TLS in the kernel.

Figure 2H:
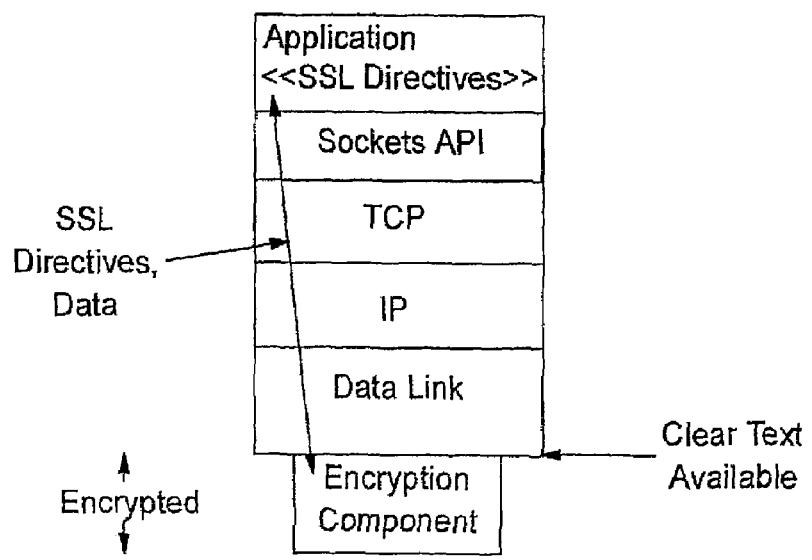

The application can also interact directly with the offloaded encryption component, as illustrated in FIG. 2H, using the same directives. In this case an SSL layer is not required. Both of these variations require that the application itself be SSL-enabled or SSL-aware. It is envisioned that other embodiments can have components other than the application, SSL, or the stack interact with the offloaded encryption component to control the use of TLS/SSL using essentially the same processing model.

Note that in contrast to the application scenarios depicted in FIGS. 2A through 2E, which indicate that data is encrypted from the TCP layer through the bottom of the stack, the scenario in FIG. 2F has encrypted data only within the encryption component. (Physical security mechanisms may be used to ensure that security exposures are controlled in this environment.) Also note that clear text is shown as being available above the TCP layer in the scenarios represented in FIGS. 2A through 2E, whereas in the offloading scenarios of FIGS. 2F and 2G, clear text is available throughout the stack.

A number of different encryption components may be used in the scenarios represented by FIG. 2F and FIGS. 2G and 2H, including an SSL proxying device or other outboard device, or an adapter having an encryption chip.

One prior art offloading technique uses a cryptographic co-processor, resident on the same system. In this case, the use of the co-processor is invoked by the communications endpoint that is executing the server or client application. Control is given to the co-processor to process clear text data or encrypted data (depending on the direction of flow), and the co-processor returns encrypted or clear text data, respectively. The co-processor may optionally process and prepare some of the SSL security protocol header information in addition to cryptographic processing on the data. The continuation of data processing by the stack occurs when the co-processor returns the processed data. In this prior art case, the cryptographic co-processor is invoked as a side process during data processing. This technique requires the data to cross a data bus two additional times when compared to non-SSL data (once to pass the input clear text to the co-processor and a second time to get the encrypted results, for the outbound data case). This is inefficient and time-consuming.

Another prior art offload technique involves a complete SSL security protocol offload from the system that is executing the server or client application. In this case, the offload device is inserted into the data path external to the endpoint communications system, and performs SSL security protocol processing on data in transit from or to the endpoint communications system. This technique uses less endpoint communications system resources than the other prior art technique, since all SSL security processing is offloaded, eliminating the two data bus crossings; however, there is no cooperation between the communications endpoint system and the offload device.

The offloading technique of the present invention, on the other hand, offloads the security protocol processing, and eliminates the two data bus crossings and co-processor costs, while allowing the communications endpoint system to remain in control of the offload process or encryption component. Control is maintained by using a kernel-based SSL component of an above-described scenario within the TCP/IP system. See the discussion above, explaining how space is reserved in the data packets for inserting SSL information, how keys are transmitted to the encryption component for performing encryption on a particular connection, etc. Thus, when the encryption component finishes its processing, the encrypted data is already formatted as messages or frames that can be sent directly to their destination. And, when SSL is to be disabled, a directive sent from the stack to the encryption component according to the present invention informs this component to let data flow through unchanged (i.e. unencrypted) on the path to its destination.

An added benefit provided in this sixth scenario over those prior art offloading techniques which perform complete offload is that those prior art offload techniques are unconditional, forcing an encryption component to rebuild the data packets before transmission can be performed. The present invention, on the other hand, does not need to rebuild packets because space for security information is reserved in outbound data that is to be encrypted. Furthermore, prior art offloading does not provide a way to transfer client or server certificates; the present invention defines security directives for this purpose.

It is contemplated by the present inventors that several different strategies may be used to provide implementations of the present invention. In a first preferred embodiment, support is provided for the first, second, fourth, and fifth scenarios described above. In a second preferred embodiment, support is provided for the third scenario. In a third preferred embodiment, support is provided for the sixth scenario. A fourth preferred embodiment is defined which may apply to any one or more of the scenarios. (However, other groupings may be implemented without deviating from the inventive concepts disclosed herein.)

Figure 14:
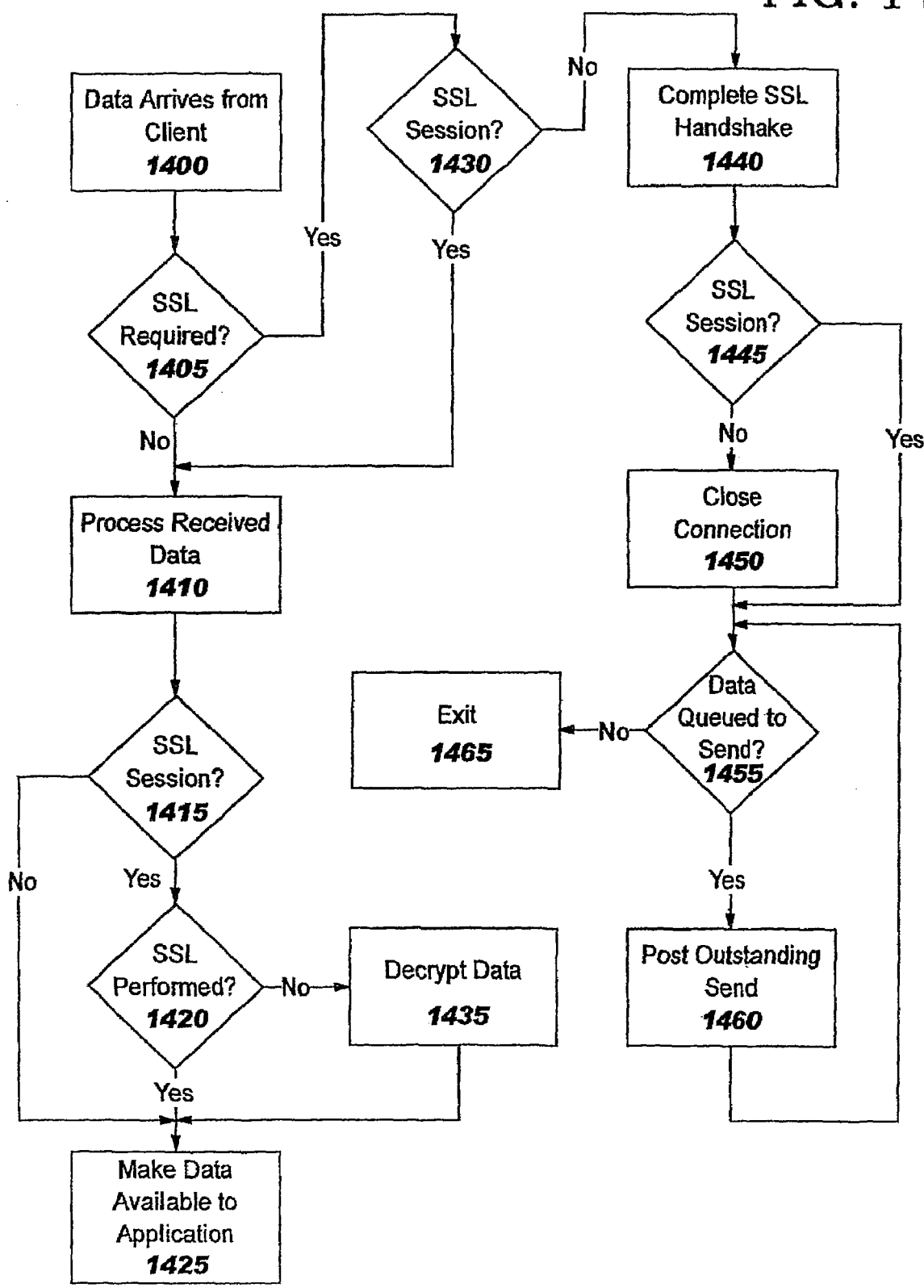
Figure 15:
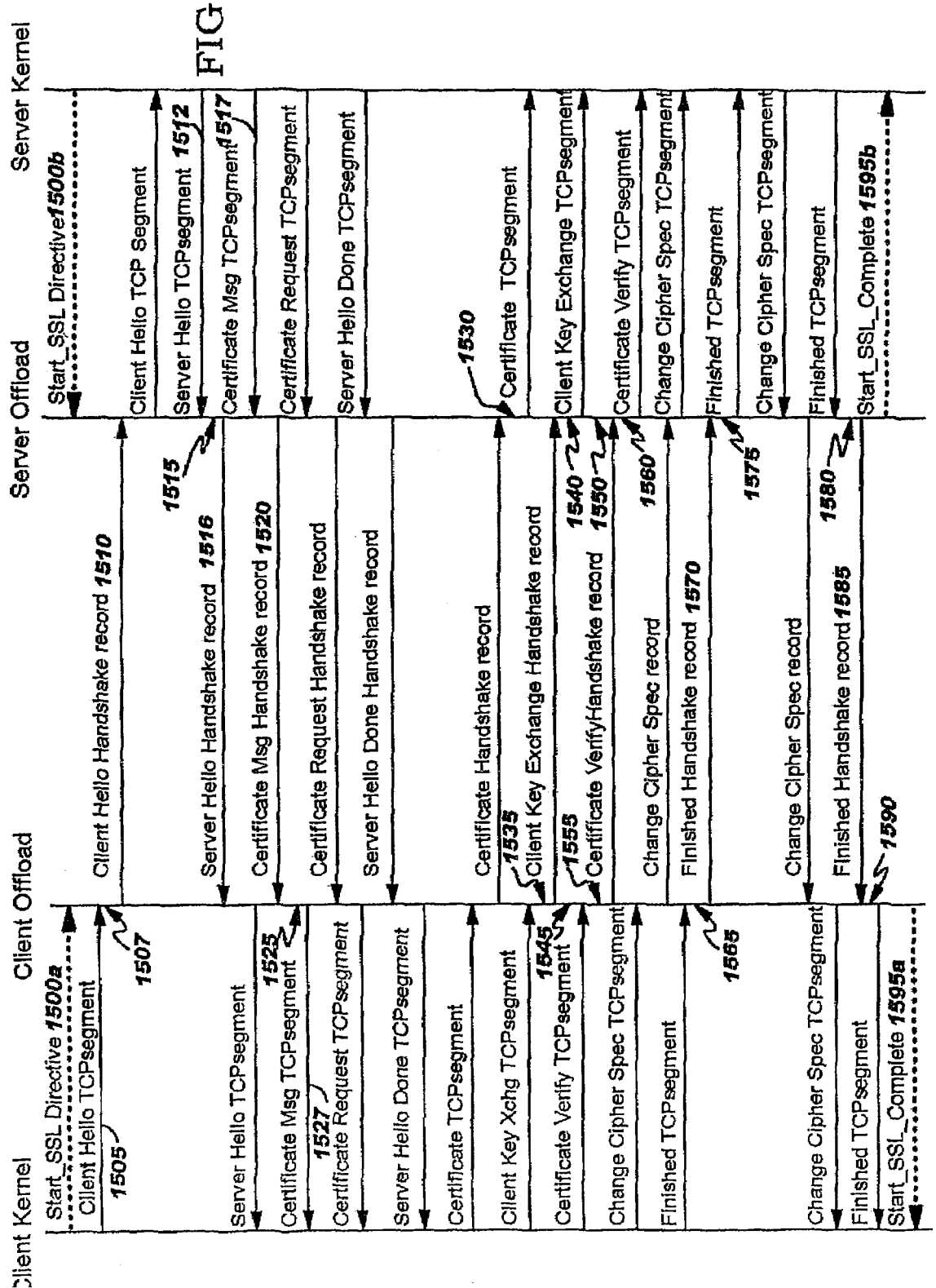
FIGS. 15 through 17 provide message flow diagrams showing message exchanges that may be used to implement secure handshake offload, according to another embodiment of the present invention.
Figure 16:
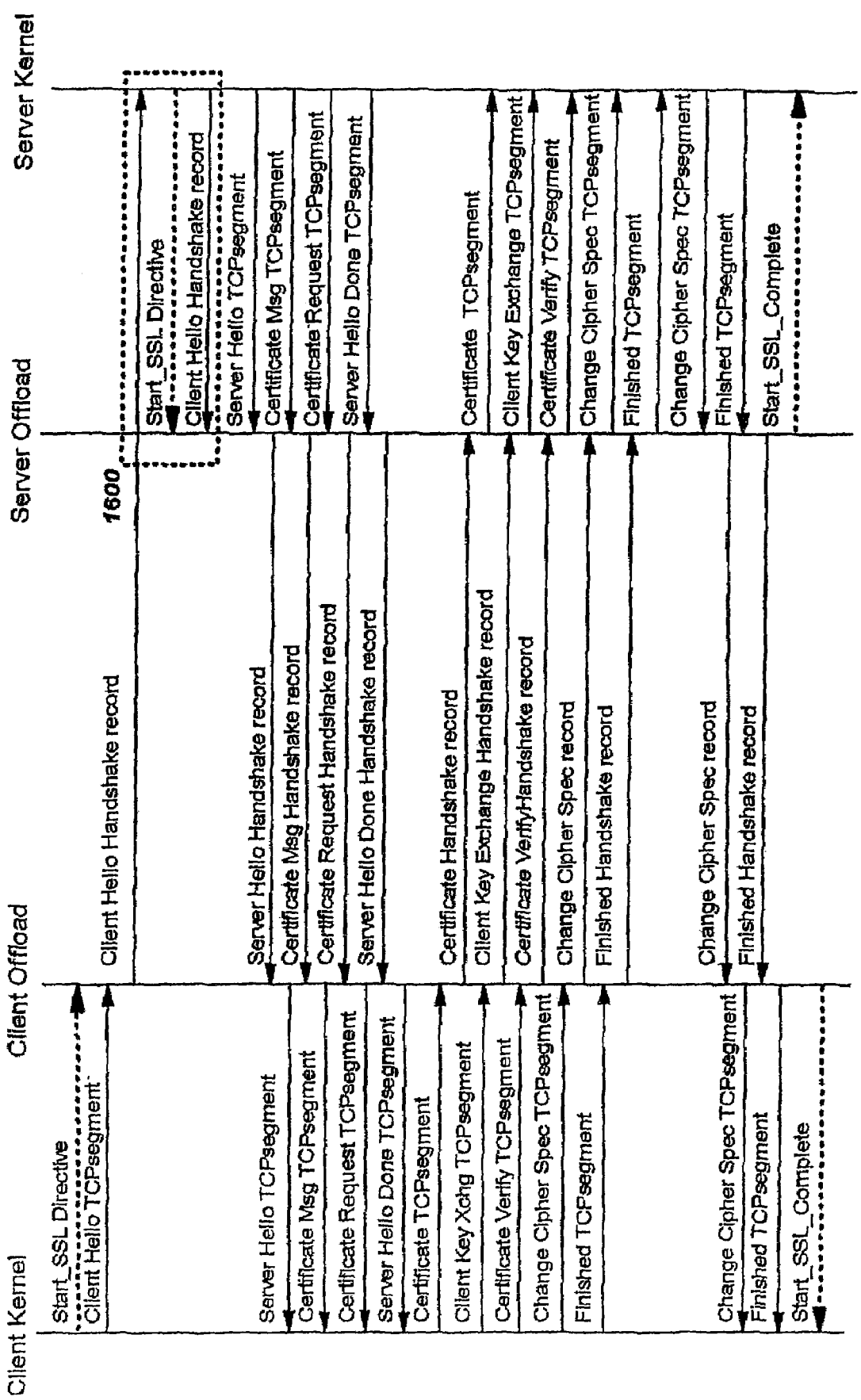
Figure 17:
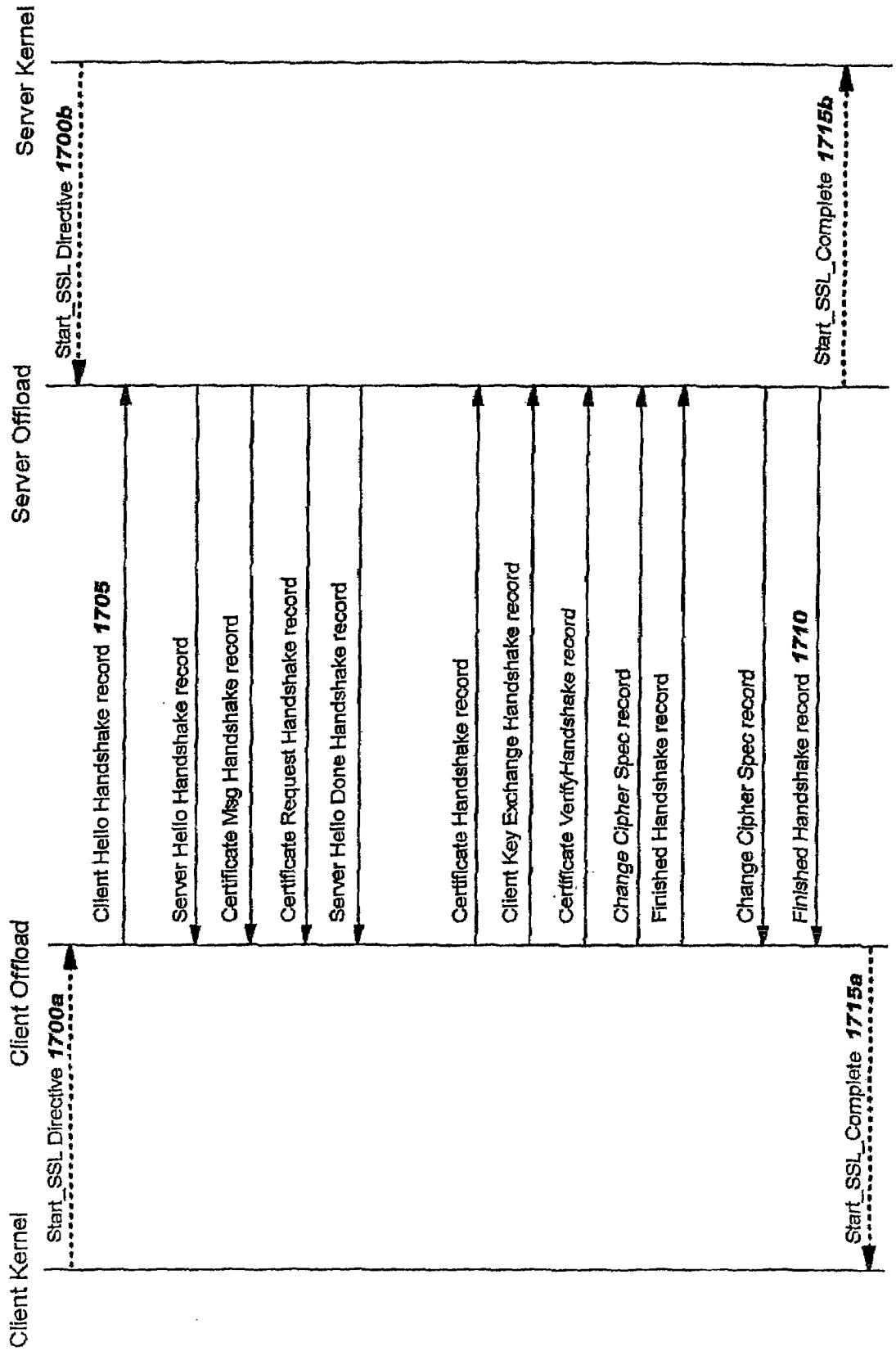

Turning now to the flowcharts depicted in FIGS. 3 through 8, logic will be described which may be used to implement the first and second preferred embodiments of the present invention. The flowcharts in FIGS. 9 through 14 may be used to implement the third preferred embodiment, and are discussed subsequently. The flow diagrams in FIGS. 15 through 17 illustrate use of the fourth preferred embodiment, and are discussed last.

Figure 3:
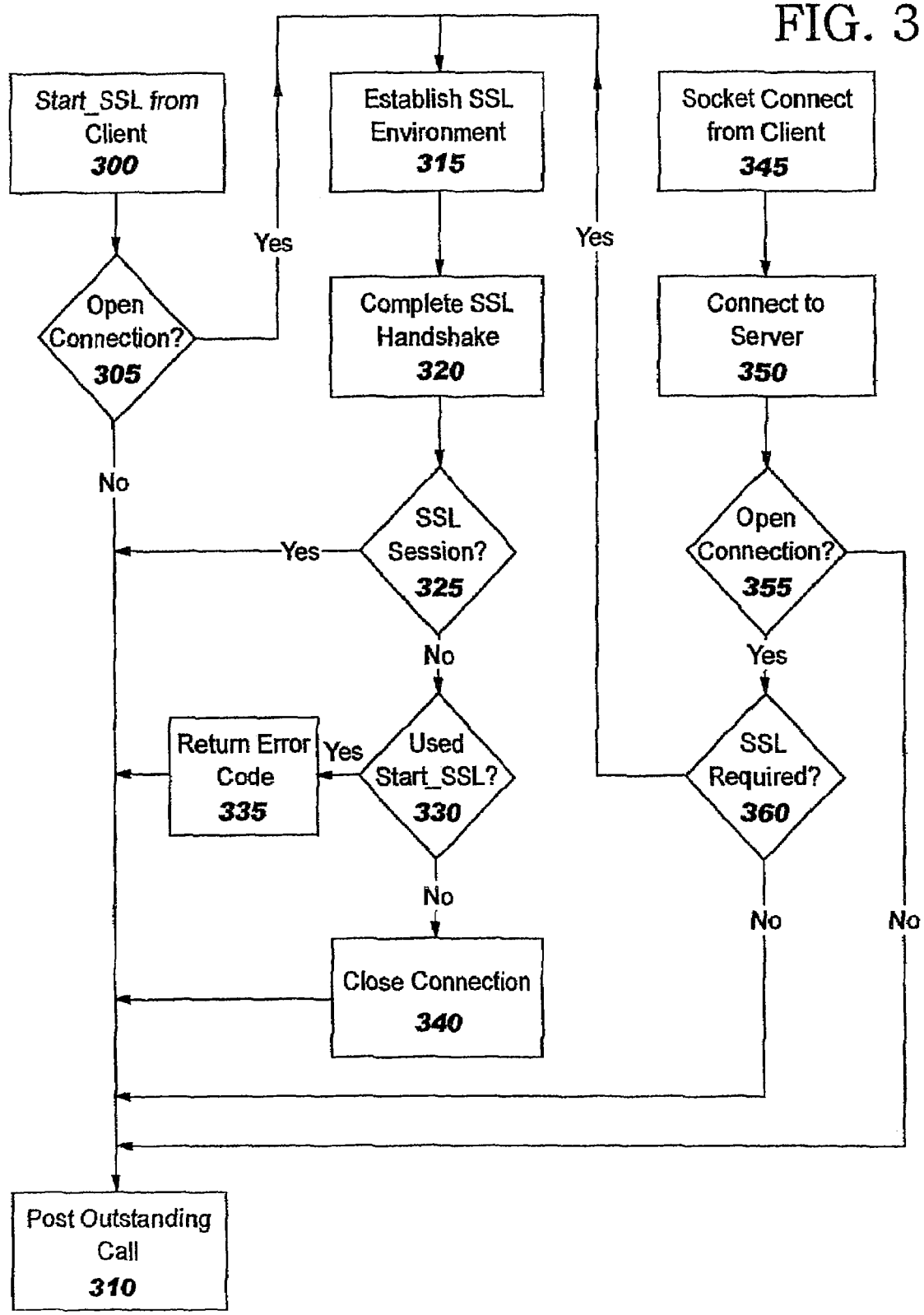
FIG. 3 provides a flowchart showing logic which may be used to implement a session establishment operation in a client, according to preferred embodiments of the present invention.

FIG. 3 depicts session establishment operating to initialize secure communications in a client. Note that the logic in FIG. 3 responds to two different input paths: the path beginning at Block 300 is taken when the client issues a Start_SSL directive to explicitly initialize secure communications, and the path beginning at Block 345 is taken for normal socket connect operations. (As can be seen, the paths converge at Blocks 315 and 310.)

The Start_SSL directive may be used, for example, by client applications (and server applications; see Block 400 of FIG. 4) that are SSL-aware and are coded to use such directives for invoking SSL APIs (as in the fourth scenario described above). This directive may also be used by applications that are SSL-enabled, when the start of security processing is translated into a Start_SSL directive as has been described above. The directive indicates the client's (or server's) request that SSL be started on this socket. In preferred embodiments, the SSL API intercepts this directive and passes the request to the TCP/IP stack using a call such as "setsockopt( )" or "ioctl( )" (the details of which are known in the art and do not form part of the present invention). As an alternative, an application that is not already enabled for prior art SSL functions but which has been modified to support the features of the present invention may directly invoke the setsockopt( ) or ioctl( ) call (or similar call, which may be specially designed for this purpose) to signify to the stack that SSL use is desired. In either case, in Block 300, the TCP/IP stack receives the directive from the client application over a socket interface. In preferred embodiments, the Start_SSL directive may carry (or reference) configuration information needed to set up an SSL environment and establish an SSL handshake. This configuration information may include, but is not limited to, SSL requirements such as: SSL authentication information for this client (such as the client's digital certificate); cipher suites options, as defined by the security protocol, in order of preference (that is, a list of encryption algorithm/authentication algorithm pairs to be proposed during the SSL handshake); and the name of the key ring to be used by the stack in selecting an encryption key. Security policy information may be used as an alternative to (or in addition to) elements of this local configuration information, where the security policy may be stored in a database or other repository and may be applicable to multiple applications within an enterprise.

The key ring contains certificates that represent the client or server application user, the user private key that is associated with the certificate, and also certificates for trusted certificate authorities. In preferred embodiments, the open of the key ring should be done under a user identity of the owner of the key ring. By opening the key ring under the owning user's identity (on systems that check user permissions to open files), it is assured that another user cannot access the key ring or otherwise assume the identity of that user through the use of the private key. The TCP/IP stack should use the user identity associated with the issuer of the socket call that results in an SSL environment creation. Alternatively, the key ring could be opened under the user identity of the TCP/IP stack. This method would require that the user identity associated with the TCP/IP stack be authorized to open all key rings.

In Block 305, a check is made to determine if the TCP connection is already open. An open TCP connection is needed to perform the SSL handshake. If this test has a negative result, then processing continues at Block 310 where the outstanding Start_SSL call is posted complete. Otherwise, control transfers to Block 315. If this is the first instance of an SSL initialization, then Block 315 creates the SSL environment (i.e. SSL data structures that are to be shared by multiple connections). The steps required for creation of an SSL environment are well known in the art, and a detailed description thereof is not deemed necessary to a full understanding of the present invention.

After Block 315 creates the SSL environment, Block 320 completes the SSL handshake. As in the prior art, the first sequence of the handshake for the client is to send an SSL_CLIENT_HELLO message. The SSL session handshake is complete when an SSL_FINISHED message has been received and successfully processed by SSL. Processing then continues at Block 325.

A check is made by Block 325 to determine if the handshake completed successfully. If so, then control transfers to Block 310, which was described above. Otherwise, when the SSL handshake did not complete successfully (as determined by the SSL protocol), Block 330 checks to see if the entry into the processing of FIG. 2 was triggered by a Start_SSL directive. If not (i.e. entry into FIG. 2 was by way of a normal socket connect, and an application-transparent decision was made to use SSL), then processing continues at Block 340 which closes the connection, and the call is posted complete at Block 310. Otherwise, when the test in Block 330 has a positive result, then processing transfers from Block 330 to Block 335 where an error code is preferably returned to the application (which requested use of SSL with the Start_SSL directive) instead of closing the connection. The outstanding call is then posted complete at Block 310.

If the stack maintains an SSL-enablement flag (or similar indicator) separately from the configuration or policy information which requests use of SSL, then when Block 325 has a positive result (that is, the handshake successfully completed), the stack also updates the flag to signify that SSL is enabled.

Turning now to the input path for normal socket connect operations, at Block 345, the TCP/IP stack receives a socket connect issued by a client application. (This path may be taken for applications according to the first, second, and third scenarios described above, as well as for those according to the fifth scenario when SSL enablement logic in the application has been converted to non-operational code.) In response to receiving the socket connect, the TCP layer goes through the normal process of establishing a TCP connection (Block 350). A check is then made (Block 355) to see if the TCP connection was successfully established. If not, control transfers to Block 310. When the TCP connection has been established, on the other hand, processing continues at Block 360 which checks, before posting the connection complete, to see if SSL is required for this TCP connection. This determination is preferably based on local configuration information or security policy information. (Also available through configuration and/or security policy is all information required to set up an SSL environment and establish an SSL handshake, as was discussed above with reference to Block 300.) If SSL is required, then Blocks 315-340 (described above) are completed before the outstanding sockets connect call is posted complete at Block 310.

Figure 4:
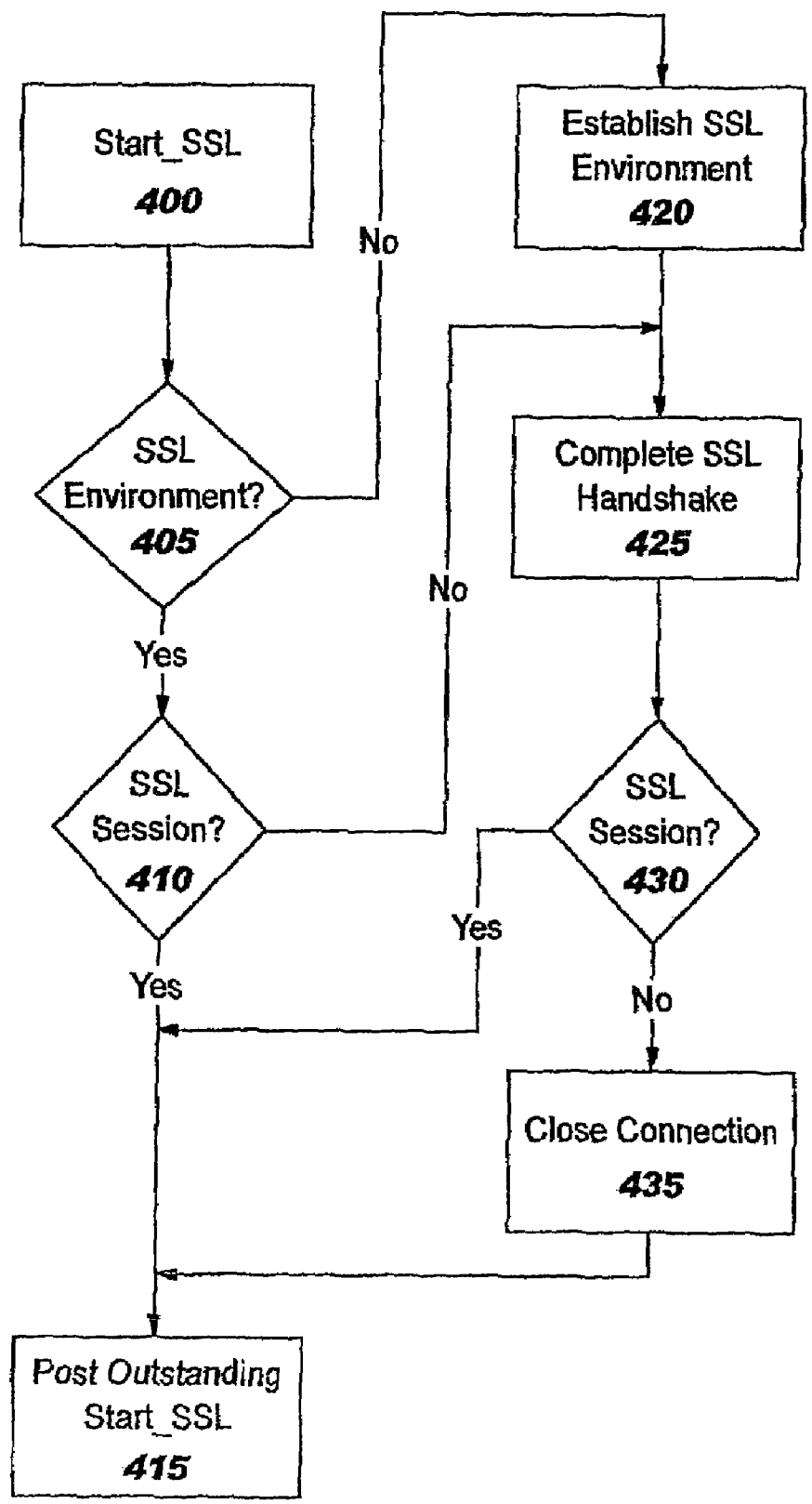
FIGS. 4 and 5 depict flowcharts illustrating logic which may be used to implement an SSL environment establishment process in a server, according to preferred embodiments of the present invention.

The server's SSL environment establishment process will now be described with reference to FIGS. 4 and 5. FIG. 4 provides logic to support establishment in response to receiving a Start_SSL directive, and FIG. 5 supports establishment using a normal socket accept. (These paths are analogous to the two input paths in FIG. 3, and the scenarios with which each path may be used are as described for FIG. 3.)

In Block 400, the TCP/IP stack receives an explicit Start_SSL directive from the server application over a socket interface. As with the Start_SSL directive received from a client, the directive received from the server may in some cases be due to an invocation of a call such as setsockopt( ) or ioctl( ) coded directly in the application, and/or the directive may carry or reference local configuration information needed to set up an SSL environment and participate in the SSL handshake, and security policy may be used to provide elements of the required information in some cases.

Block 405 checks to determine if an SSL environment (including its corresponding data structures) already exists. If so, then processing continues at Block 410; otherwise, control transfers to Block 420.

Block 410 checks to determine if the SSL session has already been established (i.e. that the SSL handshake has been successfully completed). If this test has a negative result, control transfers to Block 425 to complete the handshake; otherwise, in Block 415 the outstanding Start_SSL call is posted complete.

Block 420 creates an SSL environment (i.e. SSL data structures that are to be shared by multiple connections), as described above for Block 315. Block 425 completes the SSL handshake. The first sequence of the handshake is to wait for the client to send an SSL_CLIENT_HELLO message. The SSL session handshake is complete when an SSL_FINISHED message has been received and successfully processed by SSL.

Block 430 checks to determine if the handshake completed successfully. If not, then Block 435 closes the connection. In either case, control transfers to Block 415 to post the outstanding call complete.

If the stack maintains an SSL-enablement flag (or similar indicator), then when Block 430 has a positive result (that is, the handshake successfully completed), the stack also updates the flag to signify that SSL is enabled.

Figure 5:
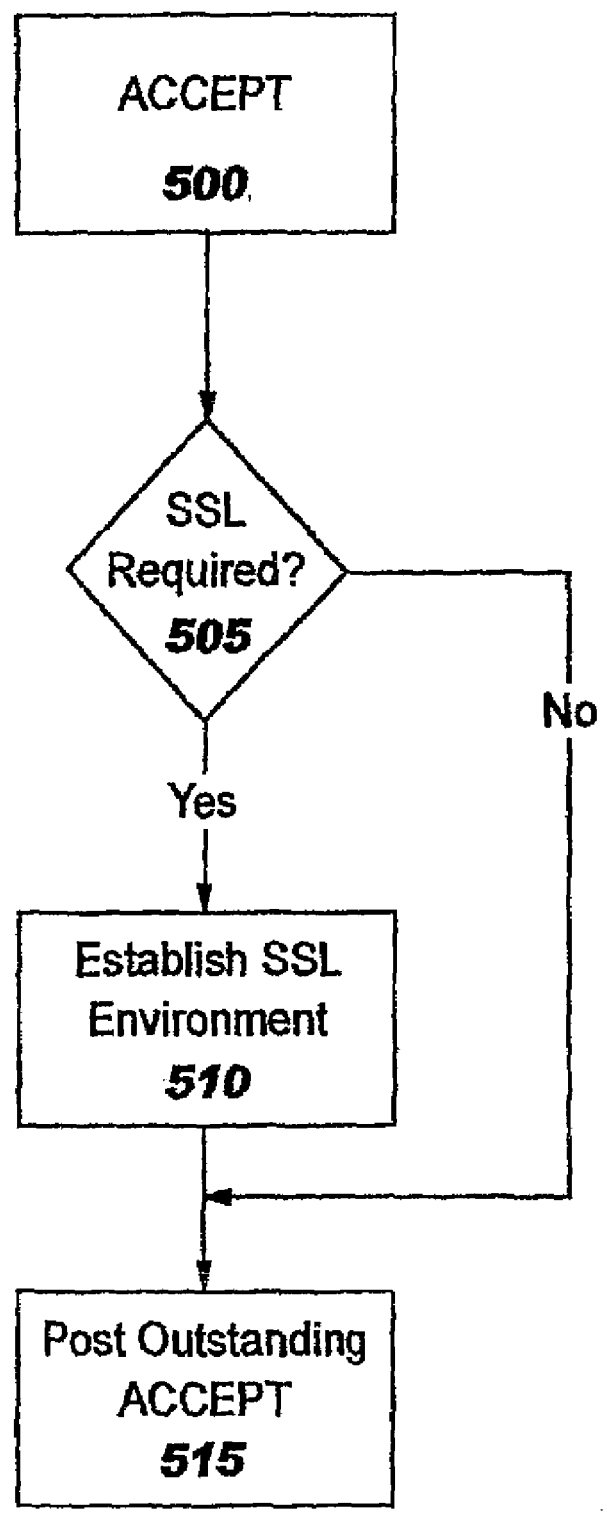

Referring now to FIG. 5, after a TCP connection is established on the server, a socket accept is normally posted complete (see Block 500). The present invention extends this process, allowing SSL communications to be initiated based upon configured information or security policy of the type which has been described above. Accordingly, at Block 505, a check is made to determine if SSL is required. If the result is positive, then Block 510 creates an SSL environment, as has been discussed (i.e. SSL data structures that are to be shared by multiple connections are created). In either case, Block 515 then posts the outstanding socket accept call complete.

Figure 6:
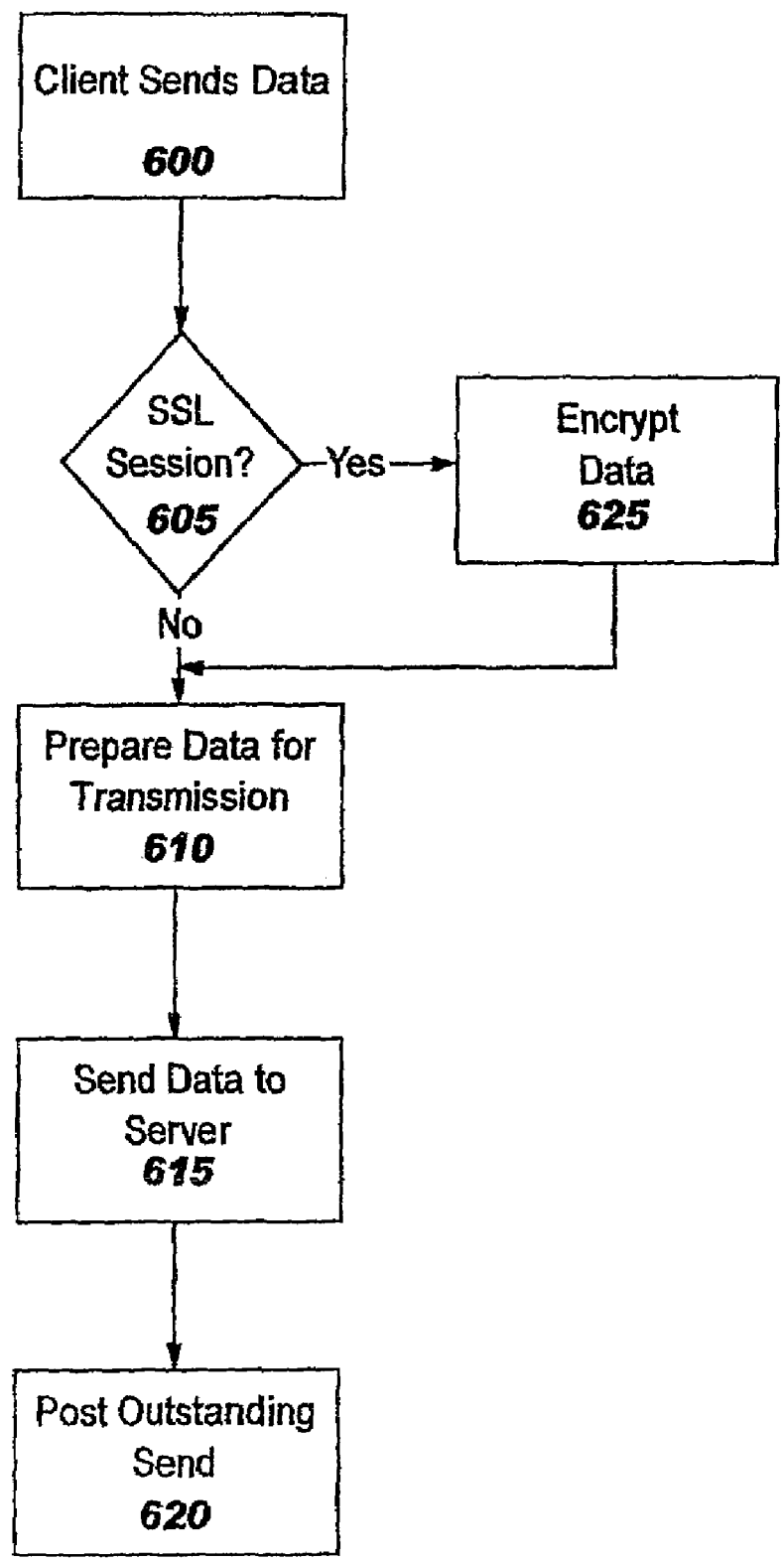
FIGS. 6 and 7 depict flowcharts illustrating logic which may be used to implement send and receive processing in a client, according to preferred embodiments of the present invention.
Figure 7:
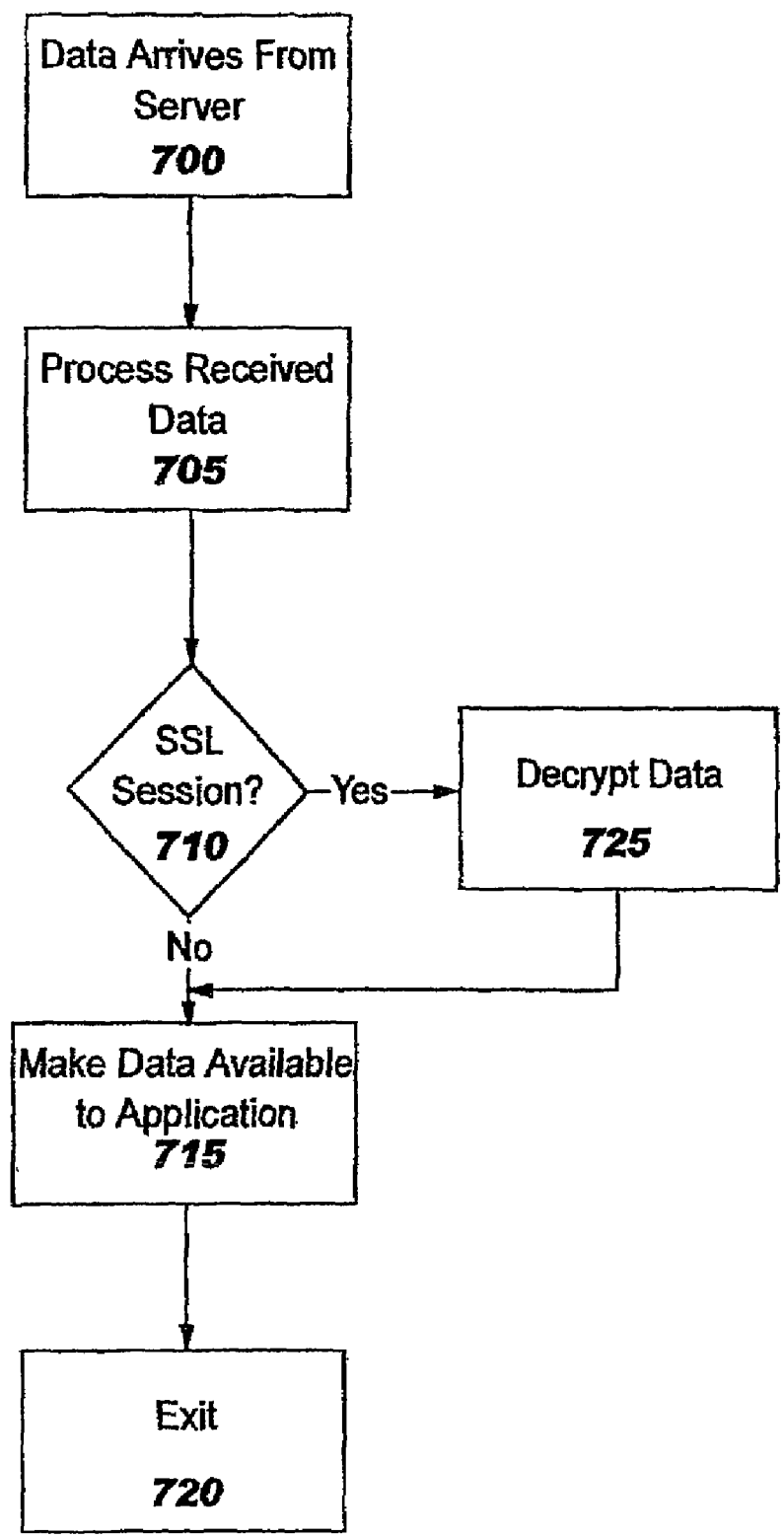

The flowcharts in FIGS. 6 and 7 illustrate logic which may be used to implement send and receive processing, respectively, in a client. The send processing begins at Block 600, where the sending client application sends data to its TCP/IP stack using a sockets write. In response to receiving this invocation, Block 605 checks to determine if an SSL session is active for this connection (e.g. by checking an SSL enablement flag or other data which may be stored in a local control block for this connection, or which may be obtained from local configuration data and/or security policy). If so, then at Block 625, the client's data is processed by SSL. In preferred embodiments, this comprises adding SSL protocol headers and trailers to the application payload, and performing cryptographic processing as negotiated for the SSL session (such as encryption and MAC creation).

After the SSL processing of Block 625, and after Block 605 when SSL is not being used, in Block 610, TCP does standard TCP protocol processing (e.g. segmenting the data as required, building TCP protocol headers, etc.) and schedules the data for eventual transmission to the server. This data is transmitted (Block 615) by the TCP/IP system to the server after IP and the data link layers have also processed the data. The sockets write is posted complete (Block 620) after all of the application data has been accepted by TCP for transmission.

The client's receive processing begins at Block 700 of FIG. 7, where inbound data from the server is received by TCP. In Block 705, TCP does standard inbound TCP protocol processing (e.g. removing data from transmission buffers, acknowledging data as required, performing checksum verification, etc.). Block 710 then checks to see if there is an active SSL session for this connection, in a similar manner to that described for Block 605. If so, in Block 725, the inbound data is processed by SSL. In preferred embodiments, this comprises removing SSL protocol headers and trailers from the application payload, and performing cryptographic processing as negotiated for the SSL session (such as decryption, MAC validation, and so forth). Block 715 makes the inbound data for the client application available, and the process is exited at Block 720.

Figure 8A:
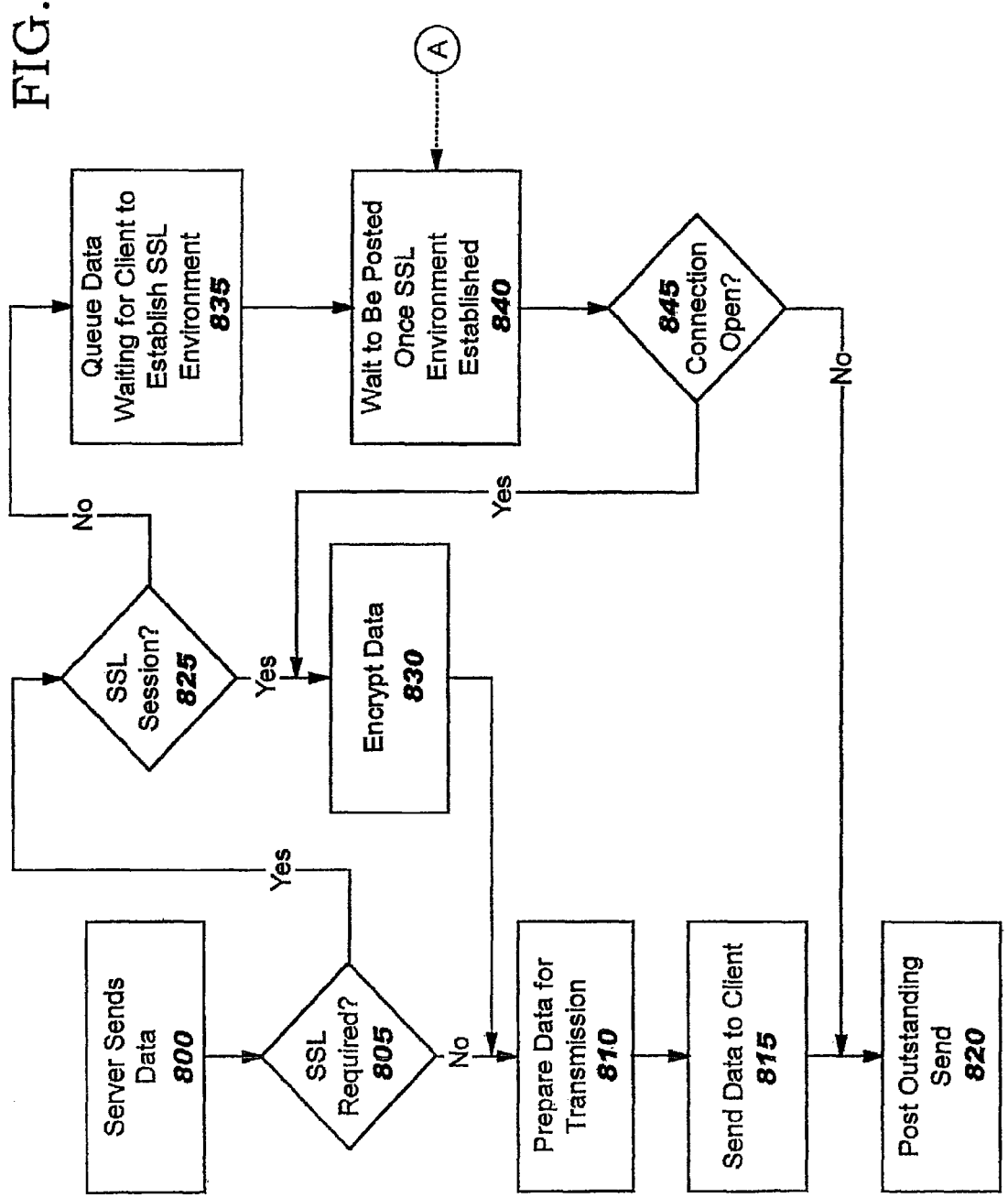
FIGS. 8A and 8B provide a flowchart illustrating logic which may be used to implement send and receive processing in a server, according to preferred embodiments of the present invention.
Figure 8B:
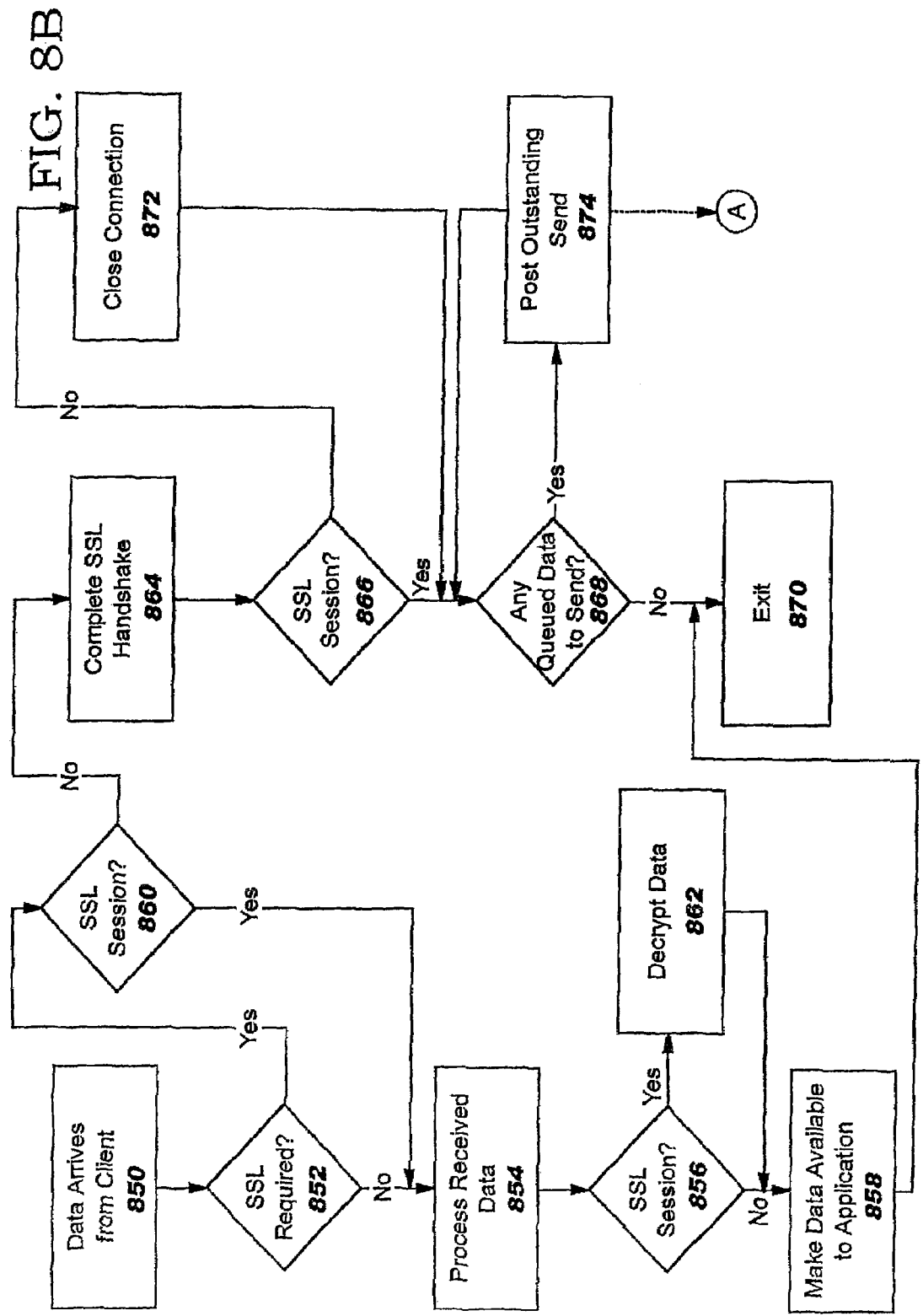

Logic which may be used to implement send and receive processing in a server is depicted in FIGS. 8A and 8B, respectively, as will now be described.

The send processing which begins at Block 800 of FIG. 8A is invoked when the sending application sends data using a sockets write. Responsive to receiving this invocation, at Block 805 a check is made in TCP to determine if SSL is required for this connection (e.g. by checking an SSL enablement flag or other data which may be stored in a local control block for this connection, or which may be obtained from local configuration data and/or security policy).

At Block 810, TCP does standard TCP protocol processing (e.g. segmenting the data as required, building TCP protocol headers, etc.) and schedules the data for eventual transmission to client. This data is transmitted by the TCP/IP system to the client (Block 815) after IP and the data link layers have also processed the data. The sockets write is posted complete (Block 820) after all of the application data has been accepted by TCP for transmission.

When SSL is required for this connection, control reaches Block 825, where TCP checks to determine if SSL has been initialized for this connection. In preferred embodiments, this involves two checks. The first is whether any SSL data structures that are to be shared by multiple connections have been created. The second is whether an SSL session for this connection has already been established. If both of these tests have positive results, processing continues at Block 830; otherwise, control transfers to Block 835.

In Block 830, the data to be transmitted to the client is processed by SSL. In preferred embodiments, this comprises adding SSL protocol headers and trailers to the application payload, and performing cryptographic processing as negotiated for the SSL session (such as encryption, digest or MAC creation, and so forth). Control then returns to Block 810 to further prepare the data for sending to the client.

Block 835 is reached when an SSL session has not yet been set up and/or initialized for this connection, and comprises enqueuing the server's application data while TCP waits for the SSL environment to be set up. (Details of setting up an SSL connection are known in the art, and are beyond the scope of the present invention.) Block 840 suspends the current outbound send operation and waits for notification that the SSL environment has been set up. The current connection will be involved in the SSL session handshake. The first sequence of the handshake for the server is for this TCP connection to wait for an SSL_CLIENT_HELLO message. The SSL session handshake is complete when an SSL_FINISHED message has been received and successfully processed by SSL. (This process is asynchronous to the current outbound operation. A post message is eventually triggered from Block 874 of FIG. 8B, discussed below.)

After receiving the SSL environment setup complete notification, a check is made in Block 845 to determine if the connection is still open. Note that the connection could have been closed if SSL was not successfully initialized (see Block 872 of FIG. 8B). If the connection is still open, then control returns to Block 830 to encrypt the data and prepare it for transmission, as has been described; otherwise, control transfers to Block 820 which posts completion of the outstanding sockets write operation.

Referring now to FIG. 8B, the receive processing at the server begins (Block 850) when inbound data is received by TCP. At Block 852, a check is made in TCP to determine if SSL is required for this connection, as described with reference to Block 805. If so, control transfers to Block 860; otherwise, processing continues at Block 854.

In Block 854, TCP does standard inbound TCP protocol processing (e.g. removing data from transmission buffers, acknowledging data as required, performing checksum verification, etc.). Block 856 then checks to see if there is an active SSL session for this connection. If so, the inbound data is processed by SSL (Block 862). In preferred embodiments, this processing comprises removing SSL protocol headers and trailers from the application payload, and performing cryptographic processing as negotiated for the SSL session (such as decryption, MAC validation, and so forth).

When the inbound data is ready to send, Block 858 makes it available for the application, after which control transfers to Block 870 to exit.

Block 860 is reached when SSL is required for this connection, as determined in Block 852. The processing in Block 860 comprises making a check in TCP to determine if SSL has been initialized for this connection. As with Block 825 of FIG. 8A, in preferred embodiments, this involves two checks. The first is whether any SSL data structures that are to be shared by multiple connections have been created, and the second is whether an SSL session for this connection has already been established. If both of these tests have positive results, processing continues at Block 854; otherwise, control transfers to Block 864.

In Block 864, the SSL handshake is completed. The first sequence of the handshake for the server is for this TCP connection to wait for an SSL_CLIENT_HELLO message from the client. The SSL session handshake is complete when an SSL_FINISHED message has been received and successfully processed by SSL. After the final message of the handshaking protocol, control reaches Block 866 which checks to determine if the handshake completed successfully. In preferred embodiments, this includes a check to determine if inbound non-SSL data was received before the handshake completed (as well as other protocol errors that may occur). If the completion was successful, then at Block 868, a check is made for outbound data previously enqueued waiting for the SSL session to complete (as shown in Block 835 of FIG. 8A).

If there is no queued data, then Block 870 exits the process. Otherwise, if data is enqueued, Block 874 issues a post to resume the previously suspended process, and processing returns to Block 868 to see if any more data is awaiting transmission. (Note that this post will re-drive the send process, as shown by the dotted line connecting to Block 840 of FIG. 8A.)

Block 872 is reached when the SSL handshake did not complete successfully. In this case, the connection is closed, and control transfers to Block 868 (allowing any enqueued data, such as error messages relating to the handshake failure, to be transmitted).

While processing for a Stop_SSL directive has not been shown in the flowcharts, it will be obvious to one of ordinary skill in the art how the logic which has been depicted may be augmented to support this directive. For example, the protocol stack simply needs to include code to accept this directive, transmit a close_notify (or analogous) alert to signal the end of the SSL session, and set the SSL-enablement flag off in response.

Figure 9:
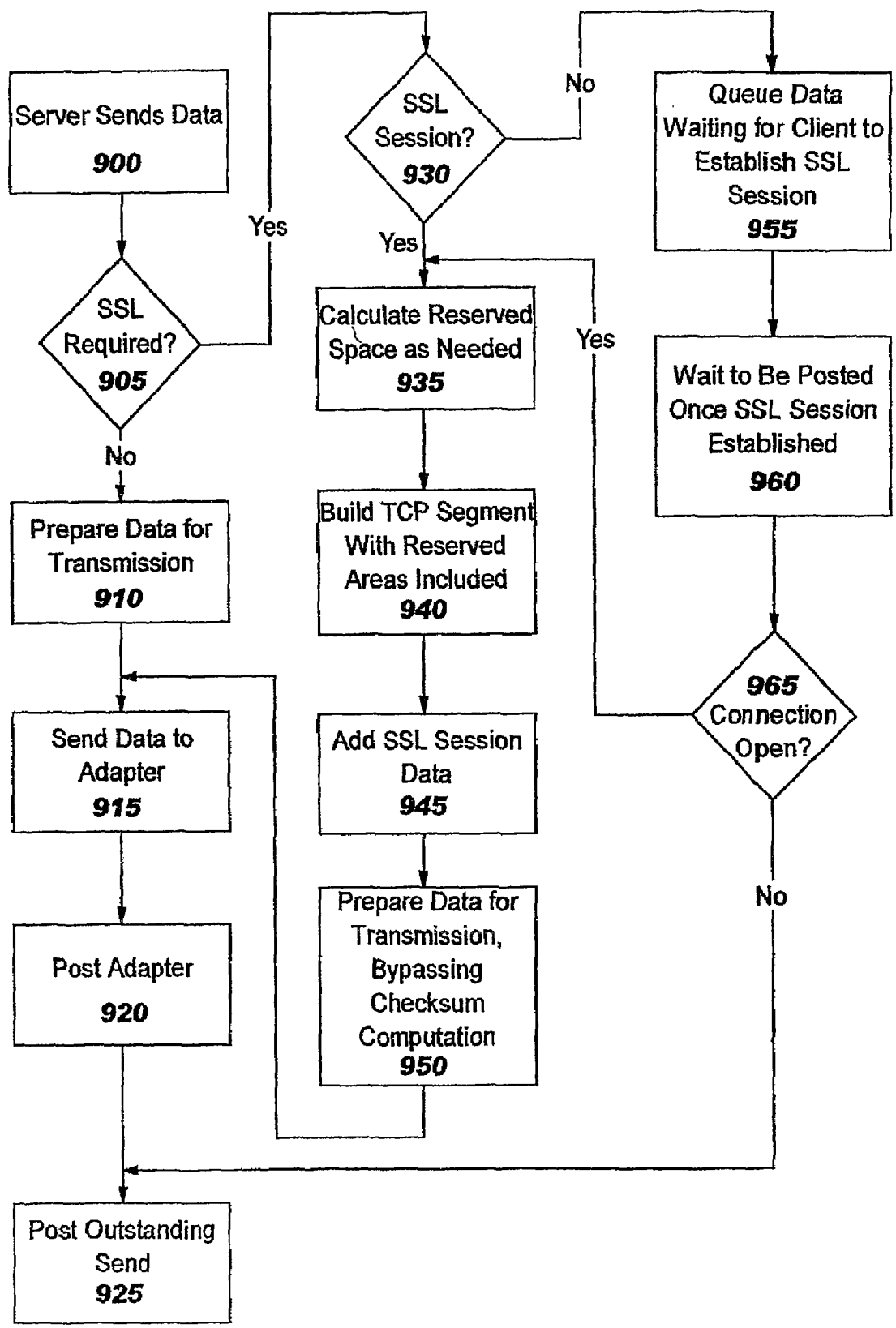
FIGS. 9 through 14 provide flowcharts which illustrate logic that may be used to implement an embodiment of the present invention which performs secure data transfer offload.
Figure 10:
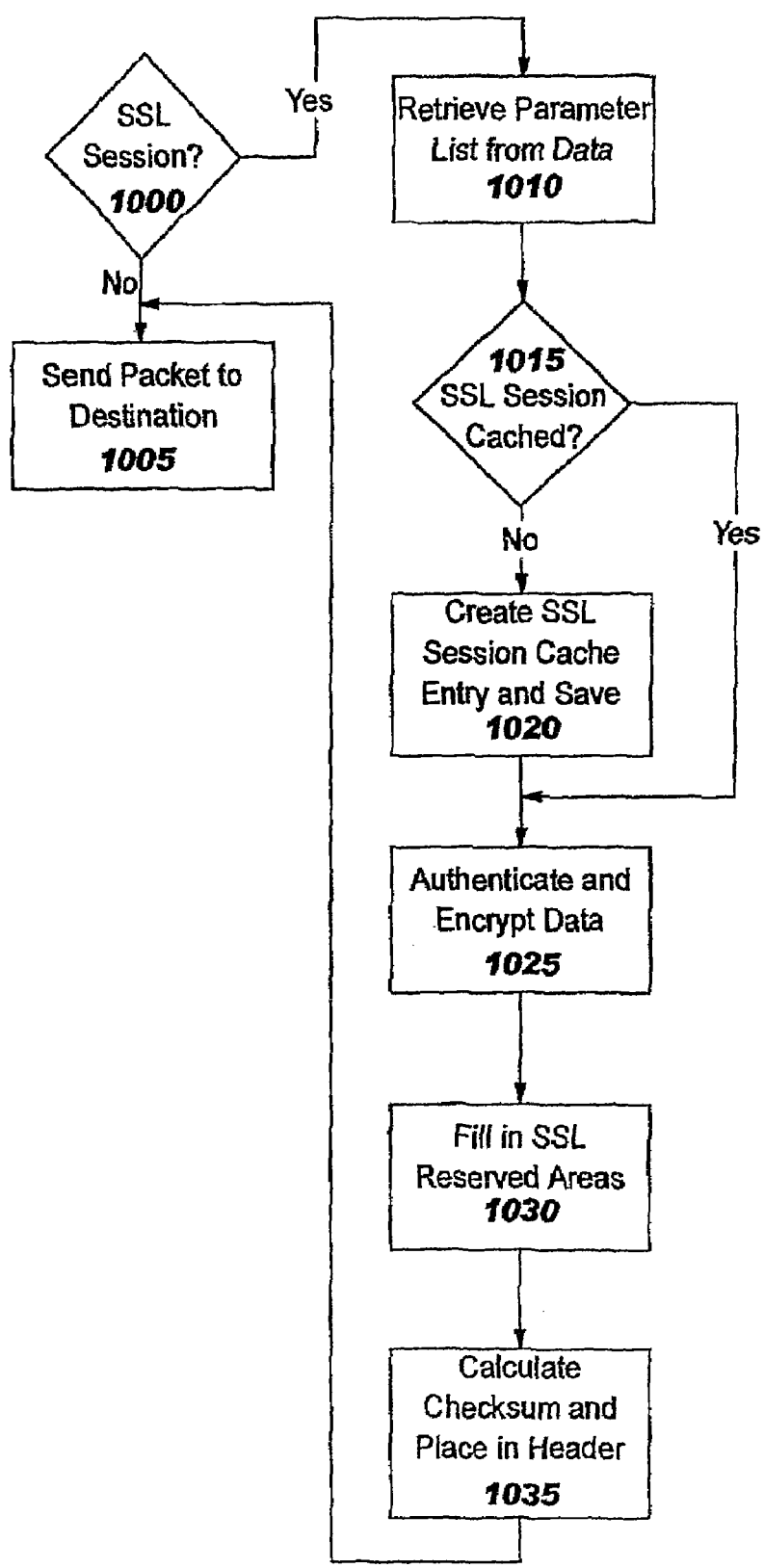
Figure 11:
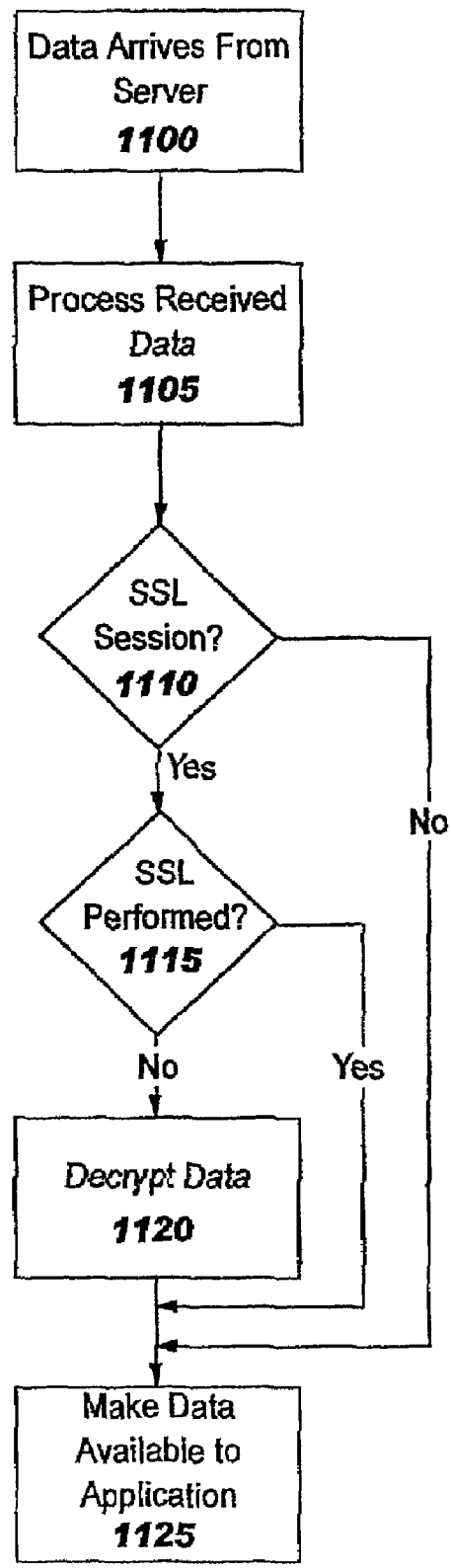
Figure 12:
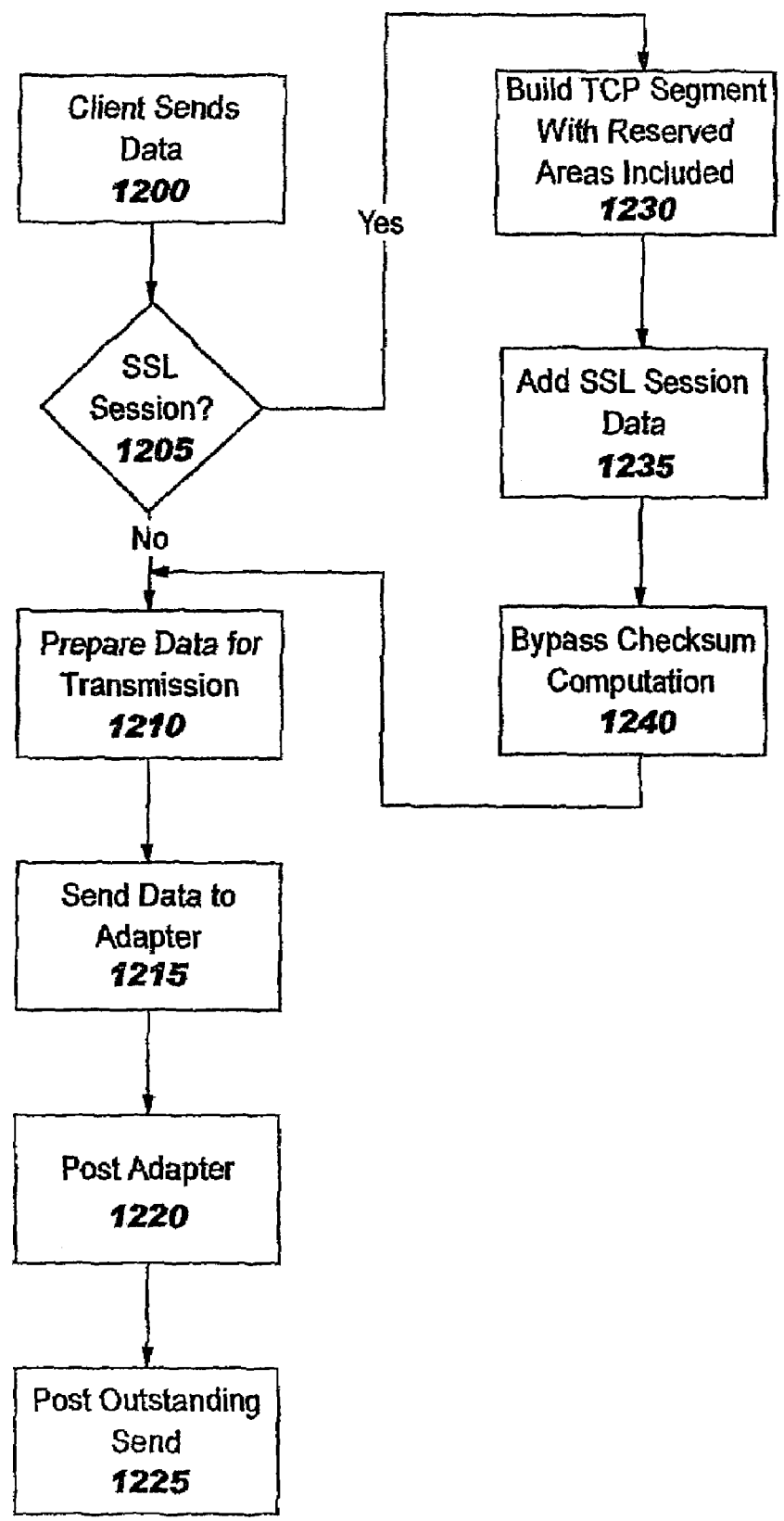
Figure 13:
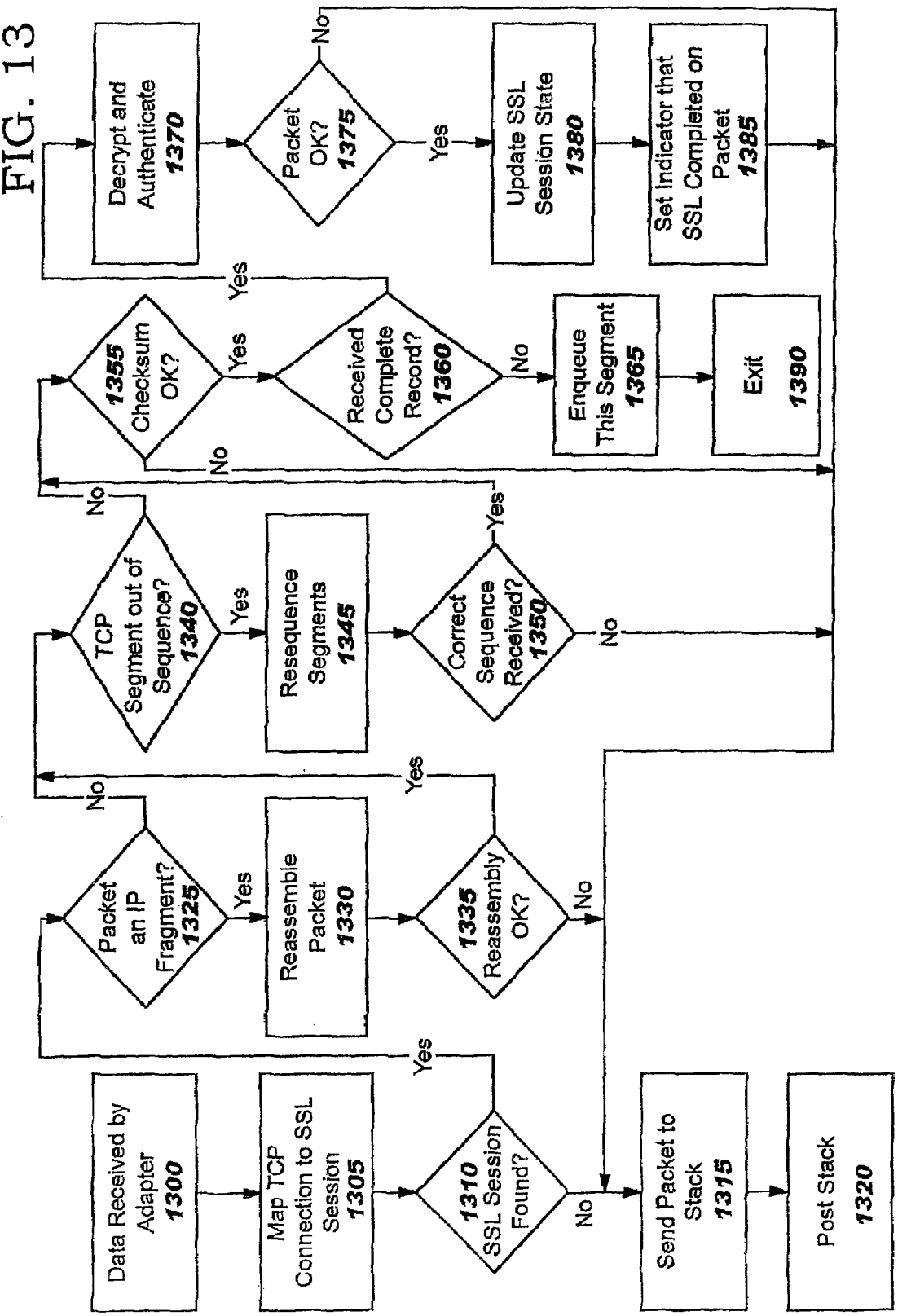

A preferred embodiment of the offload processing for data transfer, which corresponds to the sixth scenario discussed above, will now be described with reference to FIGS. 9 through 14. As was stated, this processing comprises a third preferred embodiment of the present invention. FIG. 9 depicts outbound processing occurring in the stack of a server, and FIG. 10 depicts outbound processing for the offload component (which is also referred to as "the adapter"). FIG. 11 is described next, and shows how inbound processing may be performed for a client. FIG. 12 then provides outbound client processing. FIG. 13 provides inbound offload processing, and finally, FIG. 14 provides inbound processing at the server.

In preferred embodiments, the kernel-based SSL component of an above-described scenario will provide capability to handle (i.e. process) SSL requests that cannot be handled by the offload component. To this end, the SSL states for the SSL session are kept current in the kernel representation of the SSL session and are used to reinstantiate or reset any cached SSL states in the offload component. In the case where a system is controlling multiple offload components, one offload component is considered as the "primary" component and performs all SSL offload processing. Other SSL components that are considered "secondary" could have awareness of the SSL session and its associated offload component. (Alternatively, the multiple offload components could have access to direct memory access or "DMA" where shared SSL session ID information is maintained. In this case, a primary/secondary relationship may not be required.) Possible conditions that could cause the offload to be unable to process requests are: the SSL session cache in the primary offload component is in a purged state or is in a reset state; inbound reassembly or resegmentation failure occurs; or packet routing results in the packet being delivered to an offload device that is not primary. If the offload component which is unable to process the SSL is secondary, the secondary offload component can either route directly to the primary offload component or signal the failure to the stack so that the stack can either resend the data to the primary adapter or perform SSL processing in the kernel. If the offload component which is unable to process the SSL is primary, then the kernel is responsible for either performing SSL or reinstantiating the existing SSL session (possibly in another offload component).

In FIG. 9, all steps 905 through 965 are performed in the stack when implementing the offload of FIG. 2F. For the implementations of FIGS. 2G and 2H respectively, these steps are performed by the SSL layer or by the application directly. The same is true for the remaining Figs. The implementation of FIG. 2F will be described in detail. It is assumed that any changes to the description necessary to place the steps in the SSL layer, or in the application itself, are obvious to a skilled art worker.

FIG. 9F, beginning with the outbound server data path in FIG. 9, at Block 900, the sending application sends data using a sockets write. At Block 905, a check is made in TCP to determine if SSL is required, based on stored information such as an indication in the local connection control block. (It may be assumed that this control block has been set responsive to issuance of a Start_SSL directive or call such as setsockopt( ) or ioctl( ), or because of configuration information indicating that SSL should be used, or after evaluating policy information indicating that SSL should be used.)

When SSL is not to be used, control reaches Block 910, where TCP does standard TCP protocol processing (e.g. segments the data as required, builds TCP protocol headers, etc.) and schedules the data for eventual transmission to client. In Block 915, the data is transmitted or queued to the offload by the TCP/IP system after IP and the data link layers have processed the data. At Block 920, the adapter is notified that outbound data is ready for processing. Finally, at Block 925 the sockets write is posted complete after all of the application data has been accepted by TCP for transmission.

Block 930 is reached when the test in Block 905 indicates that SSL processing for this outbound data is required. There, a check is made in TCP to determine if SSL has been initialized for this connection. According to preferred embodiments, this involves two checks. The first is whether any SSL structures that are to be shared by multiple connections have been created. The second is whether an SSL session for this connection has been established. If both of these tests have positive results, then in Block 935, in preparation for the SSL offload, the amount of reserved space to be included in the TCP segment for the SSL protocol headers and trailers is calculated.

In Block 940, the TCP segment is built to include areas calculated as reserved in Block 935. The data length includes these reserved areas. Additional buffers are allocated as required to hold additional reserved areas, and may need to be inserted into the middle of the sequence. TCP does standard TCP protocol processing (e.g. segments the data as required, builds TCP protocol headers, etc.) except that the TCP checksum calculation is bypassed (see Block 950).

Block 945 builds information required for SSL processing. Preferably, this includes the SSL session ID and sequence number, SSL trailer offset, and optionally an identification of the cryptographic algorithms and/or keys to be used (in case the offload does not have the SSL session information in its cache). In some cases, it may be desirable to always include the algorithm identification and keys, in case the offload has purged its cache. The SSL processing information is preferably passed to the offload by including it in the space reserved for the SSL trailer in the data packet. Alternatively, the SSL processing information may be sent as side data (i.e. using a separate message). Using the SSL trailer area enables the offload component and the stack to avoid allocating additional storage for the side area. Note that if TCP must allocate storage for the SSL information that exceeds the length of the SSL trailer area, the adapter will need to "clip" the trailer. (The stack and adapter need to account for this in their sequence number algorithms.)

Block 950 prepares the data for transmission, bypassing computation of the TCP checksum since it must be calculated in the offload component. The checksum must be delayed so that it can take into account SSL header and trailer information added by the offload process. Preferably, a bit is set in the header of the data before transmitting it to the offload component, informing the offload that SSL processing is required for this packet. (The offload component will therefore know that it is supposed to encrypt the data, extract the SSL parameters from the trailer area—or expect side data providing this information to be sent—and so forth, as represented by the offload's SSL processing in FIG. 10.) Control then returns to Block 915.

Block 955 is reached when Block 930 has a negative result, indicating that an SSL session is not yet setup for this connection. Here, application data is enqueued while TCP waits for the SSL environment to be set up. Block 960 suspends the current outbound send operation and waits for notification that the SSL environment has been set up. The current connection will be involved in the SSL session handshake, which operates asynchronously to the outbound processing of FIG. 9. The first sequence of the handshake for the server is for this TCP connection to wait for an SSL_CLIENT_HELLO message. The SSL session handshake is complete when an SSL_FINISHED message has been received and successfully processed by SSL. (See Block 1460 of FIG. 14, from which a post message is eventually triggered.)

In Block 965, after the SSL environment setup complete notification is received, a check is made to determine if the connection is still open. Note that the connection could have been closed if SSL was not successfully initialized. (See Block 1450 of FIG. 14.) If the connection is open, then control transfers to Block 935 to begin preparing the data for transmission. Otherwise, control transfers to Block 925 to post the outstanding send operation complete.

Turning now to the outbound data path processing of the offload component, as illustrated in FIG. 10, Block 1000 checks to determine if SSL is required for this TCP segment. This check is preferably made by checking a bit or other indication in the stack-to-offload interface, on a TCP segment basis.

If SSL is not required for this segment, then Block 1005 sends the packet to its destination. Otherwise, in Block 1010, the SSL information stored by TCP in Block 945 is retrieved by the offload from either the trailer or side data area, as appropriate. Block 1015 then checks to determine if the SSL session information has been cached.

If the SSL information is not cached, all of the necessary information should be available in the trailer or side data area for this packet, or else the packet will be discarded. (Alternatively, if the necessary information is not available, the offload component could signal to the stack that cached information for this SSL session ID is needed. This signal may be passed, for example, using a DMA operation.) When the SSL session information was not already cached, Block 1020 caches it based on information in the trailer or side data area.

At Block 1025, based on negotiated SSL cipher suites, SSL authentication and/or encryption of the outbound data is performed by the offload component. Block 1030 then fills in the SSL header and trailer information into the reserved areas, and in Block 1035, the TCP checksum is calculated and placed in the packet header. (At this point, a complete TCP segment is available, so a valid TCP checksum can be created.) Control then returns to Block 1005, where the TCP packet is sent to its destination. The processing of this outbound packet by the offload component is then complete.

FIG. 11 presents processing that may be used in a client to process inbound data. In Block 1100, data from the server application arrives at the client stack after being sent from the offload component. In Block 1105, the client's TCP does standard inbound TCP protocol processing (such as removing data from transmission buffers, acknowledging data as required, performing checksum verification, and so forth). If SSL was performed by the offload, however, then checksum verification is bypassed.

Block 1110 checks to see if there is an active SSL session. If not, then control transfers to Block 1125. Otherwise, Block 1115 checks to see if SSL processing was performed by the offload component. If this test has a negative result, processing continues at Block 1120 where the inbound data is processed by the SSL in the client's stack. This comprises removing SSL protocol headers and trailers from the application payload and performing cryptographic processing as negotiated for this SSL session (e.g. decryption and MAC validation).

Block 1125 makes the clear text data available to the client application, and the processing of FIG. 11 is then complete for this invocation.

Logic underlying preferred embodiments of a client's outbound data path processing for the offload scenario is represented by FIG. 12. This process begins at Block 1200, where the sending application sends data using a sockets write. In Block 1205, a check is made in TCP to determine if SSL processing is required for this outbound data, based (for example) on an indication in the local connection control block.

When SSL processing is not required, processing continues at Block 1210, where the client's TCP implementation does standard TCP protocol processing (e.g. segments the data as required, builds TCP protocol headers, etc.) and schedules the data for eventual transmission to the server. The data is transmitted or queued (Block 1215) to the offload by the TCP/IP system after IP and the data link layers have processed the data. The adapter is then notified (Block 1220) that outbound data is ready for processing.

In Block 1225, the sockets write is posted complete after all of the application data has been accepted by TCP for transmission. The processing of FIG. 12 for this invocation then ends.

Block 1230 is reached when an SSL offload is to be performed. In preparation for this offload, the amount of reserved space to be included in the TCP segment for the SSL protocol headers and trailers is calculated. The TCP segment is built to include areas calculated as reserved, where the data length includes these reserved areas. Additional buffers are allocated as required to hold additional reserved areas. TCP then does standard TCP protocol processing (e.g. segments the data as required, builds TCP protocol headers, etc.) except that the TCP checksum calculation is bypassed. (See the discussion of Block 1240, below.)

Block 1235 builds information required for SSL processing. Preferably, this includes the SSL session ID and sequence number, SSL trailer offset, and optionally cryptographic algorithms and/or keys (in case the offload does not have the SSL session information in its cache). As discussed earlier with reference to Block 945, the information can be passed to the offload as side data or could be included in the space reserved for SSL trailer.

As noted in Block 1240, the TCP checksum is bypassed at this time, since it must be calculated in the offload. The checksum calculation must be delayed so that it can take into account SSL header and trailer information added by the offload process. Processing then returns to Block 1210 to continue preparing the data for transmission to the server.

The logic in FIG. 13 may be used to implement inbound data path processing by the adapter. Inbound data is received by the adapter (Block 1300), after which the source and destination IP addresses and source and destination port numbers are preferably used to index into a TCP connection-to-SSL session ID mapping table (Block 1305). Block 1310 checks to see if the SSL session is found there. If not, then in Block 1315, the inbound packet is sent from the offload up to the stack. (This includes packets that could not be processed or were processed with an error. If an error was encountered, the stack is preferably also passed error information as side data for logging or tracing purposes.) Next, the stack is posted (Block 1320) that data has arrived, and the adapter's inbound processing is complete for this invocation.

Control reaches Block 1325 when the SSL session was found in the mapping table. A check is then made to determine if the packet is an IP fragment or if it is a complete IP datagram. If it is a fragment, then in Block 1330, all fragments are reassembled before any inbound SSL processing. (For resequencing and/or defragmenting, no-op processing can be used alternatively in the offload component to allow all such processing to occur in the inbound stack.) Block 1335 then checks to determine if reassembly was successful, and if not, control transfers to Block 1315, which has been described. (When reassembly was not successful, this could be an IP fragment error or a case where the offload is out of synchronization with the stack, perhaps due to data arriving over a different adapter. In this case, the fragment is sent to the stack by transferring control to Block 1315 so that error logging or tracing can occur.)

Block 1340 is reached when the incoming data is a complete IP datagram (or when the datagram was successfully reassembled from incoming fragments), and checks to determine if the TCP segment is out of sequence. If so, then in Block 1345, resequencing of the TCP segment is performed. (As discussed with reference to Block 1330, no-op processing can be used alternatively in the offload component to allow this resequencing to occur in the inbound stack.) Block 1350 checks to see if the correct sequence number has been received. If not, the packet is sent to the stack by transferring control to Block 1315. (This situation could occur if data on the resequencing backlog queue has exceeded a timeout period, or in other cases where the offload is going to defer to the stack for SSL processing.)

When the correct sequence number was received, Block 1355 performs a TCP checksum validation (which must be done before headers and trailers are removed). If the validation is not successful, control returns to Block 1315 to send the packet to the stack for error processing. Otherwise, Block 1360 checks to see if a complete SSL record has been received. When the test in Block 1360 has a positive result, processing continues at Block 1370, and when the test has a negative result, this TCP segment is enqueued as shown at Block 1365. In the latter case, the processing in FIG. 13 then exits, as indicated by Block 1390; additional segments of this packet may be processed on subsequent iterations of this logic.

At Block 1370, the inbound data is processed by SSL. This comprises removing SSL protocol headers and trailers from the application payload, and performing cryptographic processing as negotiated for the SSL session (such as decryption and MAC validation).

Block 1375 checks to determine if the inbound SSL operation was successful. If not, control transfers to Block 1315, which has been described. Otherwise, when the packet has been decrypted and authenticated successfully (or other appropriate SSL processing has been performed successfully), in Block 1380, SSL session state such as the inbound sequence number is updated. Block 1385 then sets an indicator as part of the side data sent to the stack, indicating that SSL processing was successfully completed. Preferably, the SSL session ID and sequence number used are sent up as part of this side data, which may be sent using a DMA operation.

The logic in FIG. 14 may be used to implement inbound processing at the server for the offload scenario. This processing begins at Block 1400, where data arrives at the server's stack from the offload processing that originated from data sent by the client. At Block 1405, a check is made in the server's TCP implementation to see if SSL processing for this data is required, based on (for example) an indication in the local connection control block. If this test has a negative result, processing continues at Block 1410 where TCP does standard inbound TCP protocol processing (such as removing data from transmission buffers, acknowledging data as required, performing checksum verification, etc.). If SSL processing was performed by the offload component, however, the checksum verification is bypassed.

Block 1415 then checks to see if there is an active SSL session. If not, control transfers to Block 1425. If there is, then Block 1420 checks to see if SSL was performed by the offload component. If not, then Block 1435 performs SSL processing on the inbound data. This comprises removing SSL protocol headers and trailers from the application payload, and performing cryptographic processing as negotiated for this SSL session (e.g. decryption and MAC validation).

At Block 1425, clear text data is made available to the server application. This invocation of FIG. 14 is then complete.

If SSL processing is required, as determined by a positive result in Block 405, control reaches Block 1430 which checks in TCP to see if SSL has been initialized for this connection. In preferred embodiments, this comprises performing two tests. The first is whether any SSL structures that are to be shared by multiple connections have already been created, and the second is whether an SSL session for this connection has already been established. When both of these tests have positive results, control returns to Block 1410, which has been described, to perform inbound TCP processing. Otherwise, processing continues at Block 1440.

Block 1440 completes the SSL handshake. The first sequence of the handshake, as has been stated, is for the server to wait for an SSL_CLIENT_HELLO message on this connection, and the handshake is complete when an SSL-FINISHED message has been received and successfully processed by the server's SSL implementation.

Block 1445 checks to see if the handshake completed successfully. This preferably includes a test to determine if any inbound non-SSL data was received, and may also comprise checking to see if any other protocol errors occurred, and if so, then the handshake was not successful. If the handshake was successful, and SSL-enabled flag may be set if this has not already been done. As shown by Block 1450, if SSL is required but the handshake did not complete successfully, the connection is closed.

After the handshake is complete, Block 1455 checks to see if there is any outbound data that was previously enqueued, waiting for the SSL session to be established. (For example, see Block 955 of FIG. 9.) If there is no queued data, then Block 1465 exits the process. Otherwise, if data is enqueued, Block 1460 issues a post to resume the previously suspended process, and processing returns to Block 1455 to see if any more data is awaiting transmission. (Note that this post will re-drive the send process, causing Block 960 of FIG. 9 to resume.)

A preferred embodiment of offloading processing for security session establishment and control (and in particular, the handshake process) to an offload component will now be described with reference to the message flow diagrams in FIGS. 15 through 17. As stated earlier, this processing comprises a fourth preferred embodiment of the present invention. According to this fourth embodiment, the session establishment and control operations are processed by the offload device under the direction of the kernel-based SSL component. This is invoked by the Start_SSL directive being sent to the offload device. Once the Start_SSL directive is received by the offload, processing continues in one of two modes. FIGS. 15 and 16 pertain to the first mode, wherein handshake processing messages originate from the kernel. FIG. 15 depicts a first message flow for this mode, and FIG. 16 depicts a second (alternative) message flow which is preferably used when a client's Hello message arrives in a different sequence as compared to FIG. 15. FIG. 17 pertains to the second mode, wherein handshake processing begins upon receipt of a Start_SSL directive and proceeds without further interaction by the kernel, under control of the endpoints, until the handshake is complete.

In either mode, after the Start_SSL directive is received, a pending SSL session cache entry is created. At this point, when the offload receives packets, all lookups in a TCP connection-to-SSL session handshake mapping table will result in the pending cache entry being found. The handshake can then proceed either by processing kernel-originated handshake TCP segments (FIG. 15 or 16) or without further interaction with the kernel until the handshake is complete (FIG. 17). In either mode, the offload will notify the kernel when the handshake is complete. At this point, the SSL session cache is active in the offload component and ready to process SSL data records.

Turning now to the first mode, as represented by the flows in FIGS. 15 and 16, the objective is to offload one or more of the SSL operations that are highly CPU intensive to the offload component. (A list of nine of these operations is provided below, making reference to the point in the message flows where the corresponding processing at the offload component may occur.) The SSL component in the kernel maintains complete control of the packet flow during the handshake. This control is maintained by sending "starter" handshake TCP segments for outbound handshake records to the offload component.

A "starter" segment, as the term is used herein, refers to a TCP message whose contents are (at least) started by the kernel but may be completed by the offload component. Starter segments are identified in FIGS. 15 and 16 by use of the words "TCP segment" on an outbound message flow. The starter records can leverage kernel-based handshake logic, by building the records as fully as possibly, leaving the task of completing the handshake records to the offload device. Alternatively, the starter records can contain minimal information to identify, to the offload component, the handshake record to build. In either case, TCP in the kernel should provide the starter record as a TCP segment with reserved space that is the correct length for that TCP segment. (Because the offload component will perform TCP checksum processing, the TCP checksum processing in the kernel TCP can be bypassed.)

Upon receipt of the starter TCP segments, the offload component will complete the SSL processing required for the SSL handshake record identified by the particular starter segment, and the offload component will then transmit the completed SSL handshake records into the network. For example, when the offload component receives a "Client Hello" TCP segment (see element 1505 of FIG. 15) from a client, the offload completes any missing information required to form a complete "Client Hello" handshake record (see element 1510), and then transmits that completed record to the server.

When the offload receives inbound handshake records, and after successful lookup of the pending SSL session cache entry, the offload will process the handshake record. The offload will then pass the processed SSL handshake TCP segment (i.e. as a "finished" handshake segment) to the receiving kernel, preferably with information to indicate success or failure of the corresponding protocol message. For example, in response to receiving a "Certificate Msg" handshake record, as shown at element 1520 (which the server offload generates after receiving the server kernel's "Certificate Msg" TCP segment 1517), the client's offload component sends a finished "Certificate Msg" TCP segment 1527 to the client's kernel. This segment 1527 preferably includes a success or failure indication to inform the client's kernel about message-specific processing, such as whether or not the server's security certificate was successfully decoded. (The success or failure processing is preferably performed according to prior art message-specific security protocol definitions.)

In response to receiving a finished segment, the kernel-based SSL component will send the next starter segment to its offload component if one is owed (which depends on the current handshake step of the protocol).

By allowing SSL in the kernel to process starter and finished handshake segments as disclosed herein, TCP in the kernel is able to maintain the TCP connection states and sequence numbers as though it were doing the complete handshake processing. The offload component is therefore not responsible for full TCP processing or for keeping TCP in the kernel in synch or current after the handshake. As in the data offload case of the third preferred embodiment, the offload component in this fourth preferred embodiment is responsible for computing and validating the TCP checksum for handshake records.

The Start_SSL directive for the handshake (see elements 1500a, 1500b of FIG. 15) must minimally contain information to be able to process the packets. A full set of SSL initialization information is not strictly required in this directive, however, since the offload component is operating under control of the starter handshake records. The SSL information required in the starter records preferably comprises: TCP connection identifier; SSL role (client, server, or server with client authentication); SSL versions supported; and acceptable cipher suites (in order of preference).

Note that it is possible that the server offload component could receive the inbound Client Hello message before the kernel in the server component sends the Start_SSL directive to the offload. In this case, the offload component will not recognize the Client Hello because there is no pending SSL session cache entry. To address this situation, the server TCP kernel component preferably passes the Client Hello back to the offload after the Start_SSL directive. This operation is depicted in the dotted rectangle 1600 of FIG. 16. (With the exception of rectangle 1600, FIG. 16 is identical to FIG. 15.)

A "Start_SSL_Complete" response message is shown in FIGS. 15 and 16 (and also in FIG. 17, described below), and informs the kernel whether the handshaking operation was successful or not. (See, for example, element 1595a and 1595b of FIG. 15.) Preferably, this response message includes any pertinent error information. In order for the kernel to be able to maintain the SSL session state so that it can process data if required, or reset/reinstantiate the SSL session cache entry, the response preferably also contains all information relating to the session (such as the session ID, session keys, current SSL sequence number, cipher suite selected, SSL version negotiated, a digital certificate or other security credentials of the peer, etc.).

One or more security processing operations may be handled by the offload component, in order to offload processing from the kernel, if desired in a particular implementation of this embodiment of the present invention. Alternatively, these operations may be performed in the kernel prior to sending the corresponding starter segment, or after receiving the corresponding finished segment. If an operation is performed by the kernel before sending a starter segment, then the starter segment will typically contain additional information to convey the results of the operation to the offload component. Similarly, if an operation is performed by the kernel after receiving a finished segment, then this finished segment typically contains less information than a finished segment that would be sent after performing the same operation in the offload. Nine of these operations will now be described.

First, the random number generation sent as part of an initial message such as a Client Hello message (sent by a client to a server) may be performed by the offload component at the client. If performed by the offload component, this processing occurs as shown at element 1507 while creating message 1510 (and otherwise is performed by the client kernel prior to sending message segment 1505).

Second, the random number generation sent as part of a Server Hello message (sent by a server to a client) may be performed by the offload component at the server. (The Server Hello message is a response to a Client Hello message, as is known in the art.) If performed by the offload component, this processing occurs as shown at element 1515 while creating message 1516 (and otherwise is performed by the server kernel prior to sending message segment 1512).

Third, the ASN.1 decoding of the partner's security certificate (that is, the server's certificate received by the client, as shown at element 1525, or the client's certificate received by the server, as shown at element 1530) and verification of the certificate's validity (including cryptographic verifications of the certificate's digital signature) may be performed by the offload component after receiving a Certificate Message handshake record or a Certificate handshake record. Otherwise, the decoding is performed by the kernel after the offload component forwards the corresponding finished segment. ("ASN.1" refers to "Abstract Syntax Notation One", and is a standardized encoding syntax which is well known in the art. ASN.1 is described in International Standards ISO/IEC 8824 and 8825, and ITU/CCITT Recommendations X.208 and X.209.)

Fourth, the generation and encryption of a pre-master secret to be used in a Client Key Exchange message that is sent from a client to a server may be performed by the client's offload component, as shown by element 1535. (This encryption process uses the public key of the server, which is extracted from the server's security certificate, as in prior art pre-master secret encryption processing.)

Fifth, the decryption of the pre-master secret from the Client Key Exchange message received at the server's offload component may be performed by that offload component, prior to forwarding the Client Key Exchange TCP segment to the server's kernel. This is indicated at element 1540. (This decryption process uses the private key of the server, as in the prior art. Note that this private key could be passed to the server's offload component on the server's Start_SSL directive 1500*b*, or alternatively could be pre-loaded into this offload component or otherwise communicated.)

Sixth, computation of master secrets and session cryptography keys may be performed by either or both offload components, after receiving a Client Key Exchange message. This is indicated by elements 1545 and 1550 for the client offload and server offload, respectively.

Seventh, the client offload may sign the Certificate Verify message by using the client's private key (from the client's key ring) for encryption, as shown by element 1555. Similarly, the server offload may validate the Certificate Verify message by using the public key of the client (obtained from the client's certificate) for decryption, as shown by element 1560.

Eighth, computation of a MAC (or, equivalently, a digest) for the handshake may be performed by either or both offload components, after receiving a Finished TCP segment from the respective kernel. This computed MAC is to be transmitted to the partner in the Finished handshake record. The MAC computation is indicated by elements 1565 and 1580 for the client offload and server offload, to be sent in message 1570 and message 1585, respectively.

Finally, the ninth operation that may optionally be performed by an offload component is validation of the MAC from the handshake record which has been received from the partner. The validation is indicated by elements 1575 and 1590, corresponding to messages 1570 and 1585, respectively.

Turning now to the second mode in which this fourth embodiment may be processed, as represented by the flows in FIG. 17, the objective is to offload security session establishment and control. Preferably, the entire SSL handshake process is offloaded, including packet processing for the SSL handshake. The SSL component in the kernel does not receive any of the SSL handshake packets. Therefore, the offload component must have the capability to not only process the SSL handshake protocol, but also the capability of performing TCP and IP processing during the handshake process. (This is in contrast to the first mode, as described above, where the kernel is responsible for the TCP and IP processing.)

Upon receipt of the Start_SSL directive (see element 1700*a* of FIG. 17), the offload component with the SSL client role completely prepares and sends the first handshake record (a Client Hello message 1705). Upon receipt of the Start_SSL directive (see element 1700*b*), the offload component with the SSL server role waits for this record to be received from the client. When an offload component receives any of the inbound handshake records (see the message flows between elements 1705 and 1710), and after successful lookup of the pending SSL session cache entry, the offload will completely process the handshake record. The offload will then respond with the next SSL record in the protocol sequence if one is owed (depending on the current handshake protocol step).

The Start_SSL directive (see elements 1700*a*, 1700*b*) for this complete handshake offload processing preferably passes complete SSL initialization information from the kernel to the offload component since the offload is not operating under control of "starter" handshake records (as was the case in the first mode described above). In addition to the TCP connection identifier, the SSL role (client, server, or server with client authentication), SSL versions supported, and acceptable cipher suites (in order of preference), the certificate key ring will be needed by the offload component for operation in this second mode. In addition to SSL information, enough TCP and IP information as needed to process TCP and IP protocols for the connection (such as TCP segment size, current sequence numbers, and maximum transmission unit or "MTU" size) may be passed to the offload using the Start_SSL directive.

Providing the certificate key ring can be handled by having the certificate key ring available to or loaded onto the offload component. The Start_SSL directive may provide a key ring identifier to the offload component. Or, alternatively, the necessary key ring information can be passed on the Start_SSL directive. Note that one element of the key ring, the private key, is very sensitive. Therefore, an alternative to passing the key ring between the kernel and offload component is to pre-load just the private key onto the offload component. This approach may be a secure alternative if the offload component is tamper-proof and physically secure. When this information is to be passed to the offload, however, kernel-based SSL controls are preferably used to ensure that the key ring identifier or key ring data is not transmitted to the offload component via the Start_SSL directive unless the kernel is first able to either (1) successfully check the permissions to access the key ring or (2) successfully open the key ring file under the user identity of the socket caller. This approach ensures that another user cannot assume the identity of the intended user through unauthorized or erroneous access to the key ring data during the SSL handshake.

The security handshake then proceeds between the offload components, as shown by the sequence of message flows from element 1705 through element 1710. Following these flows, the Start_SSL_Complete directive response in this second mode (see elements 1715*a*, 1715*b*) informs the kernel whether the handshaking operation was successful or not. Preferably, this response message includes any pertinent error information. In order for the kernel to be able to maintain the SSL session state so that it can process data if required, or reset/reinstantiate the SSL session cache entry, the response preferably also contains all information relating to the session (such as the session ID, session keys, current SSL sequence number, cipher suite selected, SSL version negotiated, etc.). The offload should also return the client certificate to the server kernel, if this certificate was supplied during the handshake, so that the certificate is available for use by the executing application. In addition to the SSL information, information required to resynchronize the kernel's TCP connection state with the offload's copy of the TCP connection state, such as the current TCP sequence number, may also be returned to the kernel using the Start_SSL_Complete response directive.

In summary, the present invention provides a number of improvements for security processing. In contrast to prior art implementations which require application code to include SSL processing, security processing using the present invention may be transparent to the application. Note, however, that existing security processing code within an application does not need to be removed. As discussed above, this code may remain and function as no-op code or as re-interpreted code, and importantly, it may continue to function for SSL enablement if the application is executed on a host that does not support the present invention. API calls that in the prior art are issued by an application may now be issued by the stack on behalf of the application. The decision to enable SSL can be based on security enablement information such as configuration data or security policy, and can also be controlled by an application using explicit enablement directives. Directives may also be provided for allowing applications to communicate with the security processing in the stack for other purposes. Functions within the protocol stack that need access to clear text, such as fast response caching, can now be supported without loss of SSL capability. No modifications to application code, or in some cases only minor modifications (such as inclusion of code to invoke directives), are required to provide SSL enablement and awareness. This greatly simplifies the application development and support process, with a corresponding cost reduction. The disclosed techniques enable backward-compatibility, increasing deployment flexibility and eliminating the need to provide applications using separate versions, one of which is SSL-enabled and one which is not, or to use "dual-path" code to support both SSL-enabled and non-secured operation within a single version. Improved SSL offloading was described, which eliminates multiple passes through the protocol stack for data packets. Variations on the offload embodiments allow the offload components to be controlled from an SSL proxy in the kernel, or directly from a separate SSL layer or from an application itself.

While several preferred embodiments of the present invention have been described, additional variations and modifications in these embodiments may occur to those skilled in the art once they learn of the basic inventive concepts. The techniques disclosed herein are based upon certain predefined characteristics of the security protocols (SSL and TLS) being processed. It will be obvious to one of ordinary skill in the art that the inventive concepts disclosed herein may be adapted to changes in the security protocols, should they occur, including complete replacement with a new protocol having the same semantics as those discussed herein. Similarly, references to TCP and IP are to be considered as illustrative and not as limiting the present invention. Therefore, it is intended that the appended claims shall be construed to include the preferred embodiments and all such variations and modifications as fall within the spirit and scope of the invention.

What is claimed:

1. A computer program product for improving security processing in a computing network, the computer program product comprising a computer readable storage medium having computer readable program code embodied therewith, the computer readable program code comprising:
   computer readable program code configured to provide a security offload component in an operating system kernel which performs security processing;
   computer readable program code configured to provide at least one control function in an SSL layer or application layer for directing operation of the security offload component;
   computer-readable program code configured to execute the at least one provided control function; and
   computer-readable program code configured to direct the security offload component to secure at least one communication of an application program;
   wherein the application program executes under the control of the operating system kernel.

2. A computer program product for improving security processing in a computing network, the computer program product comprising a computer readable storage medium having computer readable program code embodied therewith, the computer readable program code comprising:
   computer-readable program configured to perform security session establishment and control processing in a security offload component in an operating system kernel; and
   computer-readable program code configured to execute a control function in an SSL layer or application layer, thereby initiating operation of the computer-readable program code configured to perform security establishment and control processing by the security offload component;
   wherein the control function executes under the control of the operating system kernel.

* * * * *